(12) United States Patent
Son et al.

(10) Patent No.: US 12,250,714 B2
(45) Date of Patent: *Mar. 11, 2025

(54) WIRELESS COMMUNICATION METHOD AND WIRELESS COMMUNICATION TERMINAL IN HIGH-DENSITY ENVIRONMENT INCLUDING OVERLAPPED BASIC SERVICE SET

(71) Applicants: WILUS INSTITUTE OF STANDARDS AND TECHNOLOGY INC., Gyeonggi-do (KR); SK TELECOM CO., LTD., Seoul (KR)

(72) Inventors: Juhyung Son, Gyeonggi-do (KR); Geonjung Ko, Gyeonggi-do (KR); Jinsam Kwak, Gyeonggi-do (KR); Woojin Ahn, Gyeonggi-do (KR)

(73) Assignees: WILUS INSTITUTE OF STANDARDS AND TECHNOLOGY INC., Gyeongi-do (KR); SK TELECOM CO., LTD., Seoul (KR)

( * ) Notice: Subject to any disclaimer, the term of this patent is extended or adjusted under 35 U.S.C. 154(b) by 305 days.

This patent is subject to a terminal disclaimer.

(21) Appl. No.: 17/827,647

(22) Filed: May 27, 2022

(65) Prior Publication Data

US 2022/0287081 A1    Sep. 8, 2022

Related U.S. Application Data

(63) Continuation of application No. 16/945,937, filed on Aug. 3, 2020, now Pat. No. 11,375,538, which is a
(Continued)

(30) Foreign Application Priority Data

Oct. 20, 2015  (KR) .................. 10-2015-0146203
Oct. 28, 2015  (KR) .................. 10-2015-0150311
(Continued)

(51) Int. Cl.
*H04W 84/12*        (2009.01)
*H04B 7/26*         (2006.01)
(Continued)

(52) U.S. Cl.
CPC ............ *H04W 74/006* (2013.01); *H04B 7/26* (2013.01); *H04L 27/26* (2013.01); *H04L 69/22* (2013.01);
(Continued)

(58) Field of Classification Search
CPC ... H04W 74/006; H04W 24/02; H04W 28/04; H04W 28/06; H04W 52/50; H04W 74/00;
(Continued)

(56) References Cited

U.S. PATENT DOCUMENTS 8,483,741 B1    7/2013  Hussain et al.
10,045,340 B1   8/2018  Chu et al.
(Continued)

FOREIGN PATENT DOCUMENTS

CA    2 844 598      2/2013
CN    101374321      2/2009
(Continued)

OTHER PUBLICATIONS

Extended European Search Report dated Feb. 3, 2023 for European Patent Application No. 22204381.2.
(Continued)

*Primary Examiner* — Christopher R Crompton
(74) *Attorney, Agent, or Firm* — WOMBLE BOND DICKINSON (US) LLP

(57) ABSTRACT

Provided is a wireless communication terminal. The wireless communication terminal includes a transceiver; and a processor. The processor is configured to receive a signaling field of a first PLCP Protocol Data Unit (PPDU) through the transceiver, and access a channel based on information identifying a Basic Service Set (BSS) indicated by the signaling field.

9 Claims, 21 Drawing Sheets

Related U.S. Application Data continuation of application No. 15/953,404, filed on Apr. 14, 2018, now Pat. No. 10,785,795, which is a continuation of application No. PCT/KR2016/011854, filed on Oct. 20, 2016.

(30) Foreign Application Priority Data

| | | |
|---|---|---|
| Nov. 3, 2015 | (KR) | 10-2015-0154100 |
| Mar. 12, 2016 | (KR) | 10-2016-0029975 |
| Apr. 11, 2016 | (KR) | 10-2016-0044465 |
| May 20, 2016 | (KR) | 10-2016-0062425 |

(51) Int. Cl.

| | |
|---|---|
| H04L 27/26 | (2006.01) |
| H04L 69/22 | (2022.01) |
| H04W 24/02 | (2009.01) |
| H04W 28/04 | (2009.01) |
| H04W 28/06 | (2009.01) |
| H04W 52/50 | (2009.01) |
| H04W 74/00 | (2009.01) |
| H04W 74/08 | (2009.01) |
| H04W 74/0816 | (2024.01) |

(52) U.S. Cl.
CPC ........... *H04W 24/02* (2013.01); *H04W 28/04* (2013.01); *H04W 28/06* (2013.01); *H04W 52/50* (2013.01); *H04W 74/00* (2013.01); *H04W 74/002* (2013.01); *H04W 74/08* (2013.01); *H04W 74/0816* (2013.01); *H04W 84/12* (2013.01); *Y02D 30/70* (2020.08)

(58) Field of Classification Search
CPC .............. H04W 74/002; H04W 74/08; H04W 74/0816; H04W 84/12; H04B 7/26; H04L 27/26; H04L 69/22; Y02D 30/70
USPC ....................................................... 370/329
See application file for complete search history.

(56) References Cited

U.S. PATENT DOCUMENTS

| | | | |
|---|---|---|---|
| 10,104,664 | B2 | 10/2018 | Liu et al. |
| 10,206,246 | B2 | 2/2019 | Huang et al. |
| 10,257,857 | B2 | 4/2019 | Noh et al. |
| 10,356,819 | B2 | 7/2019 | Li et al. |
| 10,470,138 | B2 | 11/2019 | Kwon |
| 10,485,028 | B2 | 11/2019 | Kim et al. |
| 10,524,290 | B1 | 12/2019 | Chu et al. |
| 10,542,526 | B2 | 1/2020 | Seok |
| 10,609,730 | B2 | 3/2020 | Kim et al. |
| 10,785,795 | B2 * | 9/2020 | Son ............ H04L 69/22 |
| 10,820,304 | B2 | 10/2020 | Luo et al. |
| 10,863,502 | B1 | 12/2020 | Chu et al. |
| 11,375,537 | B2 * | 6/2022 | Son ............ H04B 7/26 |
| 11,375,538 | B2 * | 6/2022 | Son ............ H04W 84/12 |
| 11,770,853 | B2 | 9/2023 | Noh et al. |
| 2009/0052578 | A1 | 2/2009 | Sawai |
| 2011/0014910 | A1 | 1/2011 | Yonge, III et al. |
| 2012/0155350 | A1 | 6/2012 | Wentink et al. |
| 2012/0157151 | A1 | 6/2012 | Chu et al. |
| 2012/0177365 | A1 | 7/2012 | Winzer |
| 2012/0314673 | A1 | 12/2012 | Noh et al. |
| 2012/0327838 | A1 | 12/2012 | Seok |
| 2012/0327915 | A1 | 12/2012 | Kang et al. |
| 2014/0286203 | A1 | 9/2014 | Jindal et al. |
| 2014/0307726 | A1 | 10/2014 | Kang et al. |
| 2015/0078299 | A1 | 3/2015 | Barriac et al. |
| 2015/0103767 | A1 | 4/2015 | Kim et al. |
| 2015/0110093 | A1 | 4/2015 | Asterjadhi et al. |
| 2015/0181620 | A1 | 6/2015 | Seok |
| 2015/0264617 | A1 | 9/2015 | Choudhury et al. |
| 2015/0282043 | A1 | 10/2015 | Fang et al. |
| 2016/0249366 | A1 | 8/2016 | Seok |
| 2016/0249397 | A1 | 8/2016 | Seok |
| 2016/0353275 | A1 | 12/2016 | Liu et al. |
| 2016/0374087 | A1 | 12/2016 | Liu et al. |
| 2017/0006661 | A1 | 1/2017 | Huang et al. |
| 2017/0041798 | A1 | 2/2017 | Li et al. |
| 2017/0078887 | A1 | 3/2017 | Barriac et al. |
| 2017/0094685 | A1 | 3/2017 | Noh et al. |
| 2017/0105143 | A1 | 4/2017 | Seok |
| 2017/0251432 | A1 | 8/2017 | Park et al. |
| 2017/0289987 | A1 | 10/2017 | Seok |
| 2017/0294949 | A1 | 10/2017 | Zhang et al. |
| 2017/0367078 | A1 | 12/2017 | Chun et al. |
| 2017/0367129 | A1 | 12/2017 | Yang |
| 2018/0146469 | A1 | 5/2018 | Luo et al. |
| 2018/0213565 | A1 | 7/2018 | Huang et al. |
| 2018/0227952 | A1 | 8/2018 | Kim et al. |
| 2018/0235002 | A1 | 8/2018 | Son et al. |
| 2018/0249501 | A1 | 8/2018 | Ko et al. |
| 2018/0270038 | A1 | 9/2018 | Oteri et al. |
| 2018/0295567 | A1 * | 10/2018 | Ko ............ H04L 12/462 |
| 2018/0317166 | A1 * | 11/2018 | Huang ............ H04W 52/0209 |
| 2018/0324859 | A1 | 11/2018 | Kim et al. |
| 2019/0021106 | A1 | 1/2019 | Pteri et al. |
| 2019/0028898 | A1 | 1/2019 | Ko et al. |
| 2019/0029038 | A1 | 1/2019 | Kim et al. |
| 2019/0306824 | A1 | 10/2019 | Chu et al. |
| 2020/0367281 | A1 | 11/2020 | Son et al. |

FOREIGN PATENT DOCUMENTS

| | | |
|---|---|---|
| CN | 101616408 | 12/2009 |
| CN | 101647299 | 2/2010 |
| CN | 102624414 | 8/2012 |
| CN | 103081539 | 5/2013 |
| CN | 103098514 | 5/2013 |
| CN | 103299686 | 9/2013 |
| CN | 103563457 | 2/2014 |
| CN | 103916943 | 7/2014 |
| CN | 104168662 | 11/2014 |
| CN | 104321998 | 1/2015 |
| CN | 104471873 | 3/2015 |
| CN | 104488347 | 4/2015 |
| CN | 104704868 | 6/2015 |
| CN | 104853375 | 8/2015 |
| CN | 104904292 | 9/2015 |
| CN | 104954297 | 9/2015 |
| CN | 104641683 | 7/2018 |
| CN | 113950137 | 1/2022 |
| CN | 113950138 | 1/2022 |
| CN | 113950139 | 12/2022 |
| EP | 2 217 030 | 8/2010 |
| EP | 3651536 A1 | 6/2016 |
| EP | 3162156 | 5/2017 |
| EP | 3264813 A1 | 1/2018 |
| EP | 3292716 A1 | 3/2018 |
| EP | 3308590 | 4/2018 |
| EP | 3 687 101 | 7/2020 |
| JP | 2004-525586 | 8/2004 |
| JP | 2012-070090 | 4/2012 |
| JP | 2014-17866 | 1/2014 |

(56) References Cited

FOREIGN PATENT DOCUMENTS

| | | |
|---|---|---|
| JP | 2015-167417 | 9/2015 |
| KR | 10-2011-0008704 | 1/2011 |
| KR | 10-2013-0005289 | 1/2013 |
| KR | 10-2013-0028972 | 3/2013 |
| KR | 10-2014-0023850 | 2/2014 |
| KR | 10-2014-0036295 | 3/2014 |
| KR | 10-2014-0130113 | 11/2014 |
| KR | 10-2015-0052798 | 5/2015 |
| KR | 10-2015-0054625 | 5/2015 |
| KR | 10-1517321 | 5/2015 |
| KR | 10-1534865 | 7/2015 |
| KR | 10-2015-0090051 | 8/2015 |
| KR | 10-1553857 | 9/2015 |
| KR | 10-1558112 | 10/2015 |
| KR | 10-1561117 | 10/2015 |
| KR | 10-2121049 | 6/2020 |
| TW | 201436610 | 9/2014 |
| WO | 2009/089241 | 7/2009 |
| WO | 2011/102651 | 8/2011 |
| WO | 2011/108832 | 9/2011 |
| WO | 2011/115408 | 9/2011 |
| WO | 2012/077859 | 6/2012 |
| WO | 2012/165733 | 12/2012 |
| WO | 2013/085363 | 6/2013 |
| WO | 2014/107031 | 7/2014 |
| WO | 2015/003053 | 1/2015 |
| WO | 2015/038930 | 3/2015 |
| WO | 2015/050311 | 4/2015 |
| WO | 2015/060514 | 4/2015 |
| WO | 2015/061472 | 4/2015 |
| WO | 2015/064943 | 5/2015 |
| WO | 2015/076532 | 5/2015 |
| WO | 2015/102540 A1 | 7/2015 |
| WO | 2015/112780 | 7/2015 |
| WO | 2015/120488 | 8/2015 |
| WO | 2015/133648 | 9/2015 |
| WO | 2015/137618 | 9/2015 |
| WO | 2015/147874 | 10/2015 |
| WO | 2015/156616 | 10/2015 |
| WO | 2016/136116 | 9/2016 |
| WO | 2016/191087 | 12/2016 |
| WO | 2017/012182 | 1/2017 |
| WO | 2017/069543 | 4/2017 |

OTHER PUBLICATIONS

Notice of Allowance dated Mar. 17, 2023 for Korean Patent Application No. 10-2022-7038365 and its English translation provided by Applicant's foreign counsel.
Notice of Allowance dated Apr. 4, 2023 for U.S. Appl. No. 17/715,040.
Office Action dated Apr. 18, 2023 for Korean Patent Application No. 10-2023-7006655 and its English translation by Google Translate.
International Search Report for PCT/KR2016/011854 mailed on Feb. 3, 2017 and its English translation from WIPO (published as WO 2017/069543).
Written Opinion of the International Searching Authority for PCT/KR2016/011854 mailed on Feb. 3, 2017 and its English machine translation by Google Translate (published as WO 2017/069543).
International Preliminary Report on Patentability (Chapter I) for PCT/KR2016/011854 issued on Apr. 24, 2018 and its English translation from WIPO.
Office Action dated Mar. 19, 2019 for Japanese Application No. 2018-520532 and its English translation provided by Applicant's foreign council.
Extended European Search Report dated Apr. 23, 2019 for European Application No. 16857801.1.
Matthew Fischer et al.: "CID 205 BSSID Color Bits". Sep. 18, 2013, XP055421527, IEEE-SA mentor, Piscataway, NJ USA, Retrieved from the Internet: URL:https://mentor.ieee.org/802.11/dcn/13/11-13-1207-01-00ah-partial-aid-color-bits.pptx [retrieved on Nov. 3, 2017].
John Son (Wilus Institute): "Further Considerations on Enhanced CCA for 11ax; 11-14-0847-01-00ax-further-considerations-on-enhanced-cca-for-11ax", IEEE Draft; 11-14-0847-01-00AX-Further-Considerations-On-Enhanced-CCA-For-11AX, IEEE-SA Mentor. Piscataway, NJ USA, vol. 802.11 ax, No. 1, Jul. 15, 2014, pp. 1+12, XP068069563 [retrieved on Jul. 15, 2014].
Robert Stacey (Intel): "Spec Framework; 11-15-0132-09-00ax-spec-framework", IEEE Draft; 11-15-0132-09-00AX-Spec-Framework, IEEE-SA Mentor, Piscataway, NJ USA, vol. 802.11ax, No. 9, Sep. 22, 2015, pp. 1-22, XP068097995, [retrieved on Sep. 22, 2015].
Alfred Asterjadhi: Identifiers in HE PPDUs for power saving, IEEE Draft; 11-15-1122-00-00AX-Identifiers-In-HE-PPDUS-For-Power-Saving, IEEE-SA Mentor, Piscataway, NJ USA, vol. 802.11ax Sep. 12, 2015, pp. 1-18, XP068098373, Retrieved from the Internet: URL:https://mentor.ieee.org/802.11/dcn/15/11-15-1122-00-00ax-identifiers-in-he-ppdus-for-power-saving.pptx.
Office Action dated Jun. 28, 2019 for U.S. Appl. No. 15/968,681 (now published as US 2018/0249501).
Office Action dated Mar. 25, 2020 for Korean Patent Application No. 10-2018-7010293 and its English translation provided by Applicant's foreign counsel.
Office Action dated Mar. 5, 2020 for U.S. Appl. No. 16/121,546 (now published as US 2019/0021091).
Notice of Allowance dated Apr. 23, 2020 for U.S. Appl. No. 15/968,681 (now published as US 2018/0249501).
Office Action dated May 27, 2020 for Indian Patent Application No. 201827014271.
Office Action dated May 6, 2020 for European Patent Application No. 16857801.1.
Non-Office Action dated Sep. 25, 2019 for U.S. Appl. No. 15/953,404 (now published as US 2018/0235002).
Final Office Action dated Jan. 15, 2020 for U.S. Appl. No. 15/953,404 (now published as US 2018/0235002).
Notice of Allowance dated Apr. 29, 2020 for U.S. Appl. No. 15/953,404 (now published as US 2018/0235002).
Office Action dated Jul. 28, 2020 for Japanese Patent Application No. 2019-142262 and its English translation provided by Applicant's foreign counsel.
Notice of Allowance dated Jul. 24, 2020 for Korean Patent Application No. 10-2018-7010293 and its English translation provided by Applicant's foreign counsel.
Final Office Action dated Sep. 3, 2020 for U.S. Appl. No. 16/121,546.
Office Action dated Oct. 12, 2020 for Chinese Patent Application No. 201680061366.7 and its English translation provided by Applicant's foreign counsel.
Notice of Allowance dated Jul. 2, 2019 for Japanese Patent Application No. 2018-520532 and its English translation from Global Dossier.
Notice of Allowance dated Nov. 17, 2020 for Japanese Patent Application No. 2019-142262 and its English translation from Global Dossier.
Office Action dated Apr. 23, 2021 for Chinese Patent Application No. 201680061366.7 and its English translation provided by Applicant's foreign counsel.
Office Action dated Jan. 25, 2021 for Chinese Patent Application No. 201680063960.X and its English translation provided by Applicant's foreign counsel.
Office Action dated Aug. 30, 2021 for Korean Patent Application No. 10-2018-7012484 and its English translation provided by Applicant's foreign counsel.
Notice of Allowance dated Dec. 3, 2021 for Korean Patent Application No. 10-2018-7012484 and its English translation provided by Applicant's foreign counsel.
Office Action dated Dec. 17, 2021 for U.S. Appl. No. 16/945,934.
Office Action dated Jan. 25, 2022 for Japanese Patent Application No. 2020-200512 and its English translation provided by Applicant's foreign counsel.
Notice of Allowance dated Feb. 3, 2022 for U.S. Appl. No. 16/942,765.
Notice of Allowance dated Feb. 8, 2022 for U.S. Appl. No. 16/942,764.

(56) References Cited

OTHER PUBLICATIONS

Office Action dated Mar. 11, 2022 for Korean Patent Application No. 10-2022-7006593 and its English translation provided by Applicant's foreign counsel.
Office Action dated Mar. 11, 2022 for Korean Patent Application No. 10-2022-7006595 and its English translation provided by Applicant's foreign counsel.
Notice of Allowance dated Feb. 25, 2022 for U.S. Appl. No. 16/945,937 (now published as US 2020/0367281).
Office Action dated Sep. 29, 2021 for U.S. Appl. No. 16/945,937 (now published as US 2020/0367281).
Notice of Allowance dated Sep. 8, 2022 for Korean Patent Application No. 10-2022-7006593 and its English translation provided by Applicant's foreign counsel.
Notice of Allowance dated Sep. 8, 2022 for Korean Patent Application No. 10-2022-7006595 and its English translation provided by Applicant's foreign counsel.
Notice of Allowance dated Nov. 24, 2022 for Korean Patent Application No. 10-2021-7029783 and its English translation provided by Applicant's foreign counsel.
Notice of Allowance dated Jan. 30, 2024 for Japanese Patent Application No. 2022-139073 and its English translation provided by Applicant's foreign counsel.
Notice of Allowance dated Jan. 31, 2024 for Chinese Patent Application No. 202111214481.2 and its English translation provided by Applicant's foreign counsel.
Office Action dated Feb. 8, 2024 for Chinese Patent Application No. 202111214981.6 and its English translation provided by Applicant's foreign counsel.
Office Action dated Feb. 8, 2024 for Chinese Patent Application No. 202111085909.8 and its English translation provided by Applicant's foreign counsel.
Geonjung Ko et al.: "Discussions on Spatial Reuse Enhancement", doc.: IEEE 802.11-15/1118r0, Sep. 14, 2015, slides 1-8.
Office Action dated Feb. 8, 2024 for Chinese Patent Application No. 202111085876.7 and its English translation provided by Applicant's foreign counsel.
Imad Jamil et al.: "Efficient MAC Protocols Optimization for Future High Density WLANS", 2015 IEEE Wireless Communication and Networking Conference (WCNC 2015), Jul. 18, 2015, pp. 1054-1059.
Ericsson: "Additional Control Procedure during Inter-BSS Handover", 3GPP TSG CT Meeting #55, CP-120207, Xiam, People's Republic of China, Mar. 4, 2012, pp. 1-25.
ITRI: "Correction of serving cell UL/DL configuration for transmitting the PUSCH", 3GPP TSG-RAN WG1 Meeting #72bis, R1-131072, Chicago, USA, Apr. 5, 2013, pp. 1-8.
Office Action dated Feb. 7, 2024 for Chinese Patent Application No. 202111085887.5 and its English translation provided by Applicant's foreign counsel.
Office Action dated Feb. 23, 2024 for Korean Patent Application No. 10-2023-7006655 and its English translation provided by Applicant's foreign counsel.
Yasuhiko Inoue, IEEE 802.11-15/1093r0, Minutes of the TGax full meetings from the IEEE 802.11 Sep. 2015 session, Sep. 13-18, 2015, 36 pp.
Geonjung Ko et al., IEEE 802.11-16/0640r3, BSS Color Collision, May 16, 2016, 14 pp.
Robert Stacey, IEEE 802.11-15/0132r15, Specification Framework for Tgax (IEEE), Mar. 17, 2016, 50 pp.
Office Action dated Apr. 23, 2024 for European Patent Application No. 22204381.2, 8 pp.
Statement of Defense Dated Mar. 7, 2024 in the matter of Wilus Institute of Standards and Technology Inc. against Acer Computer GmbH and others, File No. 7 O 14196/23 (EP 550), English translation provided by Applicant's foreign counsel, 86 pp.
Action for Annulment Dated Mar. 7, 2024 in the matter of Acer Computer GmbH against Wilus Institute of Standards and Technology Inc., and SK Telecom Co, Ltd, File No. 7 O 14196/23 (EP 550), English translation provided by Applicant's foreign counsel, 80 pp.
IEEE P802.11ah/D2.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Sub 1 GHz License Exempt Operation, 582 pp.
IEEE Std 802.11-2012, IEEE Standard for Information technology—Telecommunications and information exchange between systems Local and metropolitan area networks—Specific requirements, Part 11: Wireless LAN Medium Access Control (MAC) and Physical Layer (PHY) Specifications, Mar. 29, 2012, 2793 pp.
Notice of Allowance dated Jun. 21, 2023 for Korean Patent Application No. 10-2022-7038365 and its English translation provided by Applicant's foreign counsel.
John (Ju-Hyung) Son et al.: "HE Trigger Frame Format", doc.: IEEE 802.11-15/0851r0, Jul. 13, 2015, pp. 1-10.
Rossi Jun Luo et al.: "OBSS NAV and PD Threshold Rule for Spatial Reuse", doc.: IEEE 802.11-15/1109r1, Sep. 13, 2015, slides 1-20.
Kiseon Ryu et al.: "CCA consideration for UL MU transmission", doc.: IEEE 802.11-15/1058r0, Sep. 13, 2015, slides 1-16.
Office Action dated Jul. 4, 2023 for Japanese Patent Application No. 2022-139073 and its English translation provided by Applicant's foreign counsel.
IEEE P802.11ah™/D5.0: "Draft Standard for Information technology—Tele-communications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation", IEEE P802.11ah™/D5.0, Mar. 2015, pp. 1-632.
Yasuhiko Inoue et al.: "Number of BSS Color bits", doc.: IEEE 802.11-15/1075r0, Sep. 14, 2015, slides 1-20.
Notice of Allowance dated Apr. 6, 2022 for U.S. Appl. No. 16/945,934.
Notice of Allowance dated Jul. 2, 2021 for Chinese Patent Application No. 201680063960.X and its English translation provided by Applicant's foreign counsel.
Office Action dated Jan. 13, 2022 for Korean Patent Application No. 10-2021-7029783 and its English translation provided by Applicant's foreign counsel.
Notice of Allowance dated May 18, 2022 for European Patent Application No. 21 167 595.4.
Office Action dated Jun. 6, 2024 for Chinese Patent Application No. 202111214474.2 and its English translation provided by Applicant's foreign counsel.
Office Action dated Jun. 13, 2024 for Chinese Patent Application No. 202111085909.8 and its English translation provided by Applicant's foreign counsel.
Office Action dated Jun. 14, 2024 for Chinese Patent Application No. 202111085887.5 and its English translation provided by Applicant's foreign counsel.
Office Action dated Jun. 14, 2024 for Chinese Patent Application No. 202111085876.7 and its English translation provided by Applicant's foreign counsel.
Office Action dated Jun. 26, 2024 for Chinese Patent Application No. 202111214981.6 and its English translation provided by Applicant's foreign counsel.
Notice of Allowance dated Sep. 6, 2024 for Chinese Patent Application No. 202111085909.8 and its English translation provided by Applicant's foreign counsel.
Notice of Allowance dated Sep. 12, 2024 for Chinese Patent Application No. 202111085876.7 and its English translation provided by Applicant's foreign counsel.
Notice of Allowance dated Sep. 12, 2024 for Chinese Patent Application No. 202111085887.5 and its English translation provided by Applicant's foreign counsel.
U.S. Appl. No. 62/101,645, filed Jan. 9, 2015.
U.S. Appl. No. 62/240,458, filed Oct. 12, 2015.
U.S. Appl. No. 62/242,197, filed Oct. 15, 2015.
U.S. Appl. No. 62/187,960, filed Jul. 2, 2015.
U.S. Appl. No. 62/236,153, filed Oct. 2, 2015.
U.S. Appl. No. 62/240,454, filed Oct. 12, 2015.
U.S. Appl. No. 62/233,881, filed Sep. 28, 2015.
U.S. Appl. No. 62/180,200, filed Jun. 16, 2015.

(56) References Cited

OTHER PUBLICATIONS

U.S. Appl. No. 62/181,408, filed Jun. 18, 2015.
U.S. Appl. No. 62/218,992, filed Sep. 15, 2015.
Yongho Seok et al.: "NAV Operation for Spatial Reuse", doc.: IEEE 802.11-15/0797r0, Jul. 9, 2015, slides 1-14.
Guoqing Li et al.: "11ax Channel Access rule", doc.: IEEE 802.11-15/1063r1, Sep. 14, 2015, slides 1-15.
Office Action dated Sep. 26, 2024 for Chinese Patent Application No. 202111214474.2 and its English translation provided by Applicant's foreign counsel.
Office Action dated Sep. 19, 2024 for Chinese Patent Application No. 202111214981.6 and its English translation provided by Applicant's foreign counsel.
Office Action dated Oct. 15, 2024 for Korean Patent Application No. 10-2023-7006655 and its English translation provided by Applicant's foreign counsel.
Office Action dated Nov. 29, 2024 for Chinese Patent Application No. 202111214981.6 and its English translation provided by Applicant's foreign counsel.
Notice of Allowance dated Dec. 19, 2024 for Korean Patent Application No. 10-2023-7006655 and its English translation provided by Applicant's foreign counsel.
Office Action (3rd) dated Dec. 13, 2024 for Chinese Patent Application No. 202111214474.2 and its English translation provided by Applicant's foreign counsel.

* cited by examiner

| (a) Legacy PPDU | L-Preamble | 1st MPDU | ... | n-th MPDU |
|---|---|---|---|---|
| | RX Operation | MYBSS | PS: Possible SR: NA (Not Allowed) | |
| | | OBSS | PS: NA (Not Allowed) SR: Possible | |

| (b) HE DL/UL SU PPDU | L-Preamble | HE-SIG-A | 1st MPDU | ... | n-th MPDU |
|---|---|---|---|---|---|
| | RX Operation | MYBSS | RCVR Verify (Inter-BSS Coll.) | PS: Possible, SR: NA (PS: NA, SR: Possible) | |
| | | OBSS | PS: NA, SR: Possible | | |
| | 1. >OBSS PD 2. Intra-BSS | OBSS | RCVR Verify (Intra-BSS Conf.) | PS: NA, SR: Possible (PS: Possible, SR: NA) | |

| (c) HE UL MU PPDU | L-Preamble | HE-SIG-A | 1st MPDU | ... | n-th MPDU |
|---|---|---|---|---|---|
| | RX Operation | MYBSS | PS: Possible, SR: NA | | |
| | | OBSS | PS: NA, SR: Possible | | |

| (d) HE DL MU PPDU | L-Preamble | HE-SIG-A | HE-SIG-B | 1st MPDU | ... | n-th MPDU |
|---|---|---|---|---|---|---|
| | RX Operation | MYBSS | Partial RCVR Verify | PS: Possible, SR: NA | | |
| | | OBSS | | PS: NA, SR: Possible | | |

| No. | Comm. Type | BSS Color/ MAC Addr | PPDU format | # of MPDUs | Power Save Operation (no Color Collision) | Power Save Operation (Color Collision) | Spatial Reuse TX (no Color Collision) | Spatial Reuse TX (Color Collision) |
|---|---|---|---|---|---|---|---|---|
| 1-1 | DL/UL SU | MYBSS | 11ax | MPDU | Not Possible | Not Allowed (Detect Inter-BSS Color Collision) | Not Allowed | Not Possible (Detect Inter-BSS Color Collision) |
| 1-2 | | | | A-MPDU | Possible after 1st MPDU | Not Allowed (Detect Inter-BSS Color Collision) | Not Allowed | Possible after 1st MPDU (Detect Inter-BSS Color Collision) |
| 2-1 | DL/UL SU | MYBSS | Legacy | MPDU | Not Possible | - | Not Allowed | - |
| 2-2 | | | | A-MPDU | Possible after 1st MPDU | - | Not Allowed | - |
| 3 | DL/UL SU | OBSS | 11ax | MPDU A-MPDU | Not Allowed | Not Allowed (Issue: Lose Power Save Opportunity) | Possible after HE-SIG-A | Possible after HE-SIG-A (Issue: Improper SR TX) |
| 4-1 | DL/UL SU | OBSS | Legacy | MPDU | Not Allowed | - | Not Possible | - |
| 4-2 | | | | A-MPDU | Not Allowed | - | Possible after 1st MPDU | - |

(b) MU

| No. | Comm. Type | BSS Color/ MAC Addr | PPDU format | # of MPDUs | Power Save Operation (no Color Collision) | Power Save Operation (Color Collision) | Spatial Reuse TX (no Color Collision) | Spatial Reuse TX (Color Collision) |
|---|---|---|---|---|---|---|---|---|
| 1 | DL MU (OFDMA/ MU-MIMO) (not mine) | MYBSS | 11ax | MPDU A-MPDU | Possible after HE-SIG-B | Possible after HE-SIG-B (Issue: May miss MYBSS HPDU during PS) | Not Allowed | Not Allowed (Issue: Lose Power Save Opportunity) |
| 2 | DL MU (MU-MIMO) (not mine) | any | Legacy (11ac) | MPDU A-MPDU | Not Possible | Not Possible (Cannot distinguish MYBSS/OBSS DL MU) | Not Possible (Cannot distinguish MYBSS/OBSS DL MU) | Not Possible (Cannot distinguish MYBSS/OBSS DL MU) |
| 3 | DL MU (OFDMA/ MU-MIMO) (not mine) | OBSS | 11ax | MPDU A-MPDU | Not Allowed | Not Allowed (Issue: Lose Power Save Opportunity) | Possible after HE-SIG-A | Possible after HE-SIG-A (Issue: Improper SR TX) |
| 4 | UL MU (OFDMA/ MU-MIMO) | MYBSS | 11ax | MPDU A-MPDU | Possible after HE-SIG-A | Possible after HE-SIG-A (Issue: May miss MYBSS PPDU during PS) | Not Allowed | Not Allowed (Issue: Lose Power Save Opportunity) |
| 5 | UL MU (OFDMA/ MU-MIMO) | OBSS | 11ax | MPDU A-MPDU | Not Possible | Not Possible (Issue: Lose Power Save Opportunity) | Possible after HE-SIG-A | Possible after HE-SIG-A (Issue: Improper SR TX) |

*FIG. 14*

WIRELESS COMMUNICATION METHOD AND WIRELESS COMMUNICATION TERMINAL IN HIGH-DENSITY ENVIRONMENT INCLUDING OVERLAPPED BASIC SERVICE SET

CROSS-REFERENCE TO RELATED APPLICATIONS

This application is a continuation of U.S. patent application Ser. No. 16/945,937 filed on Aug. 3, 2020, which is a continuation of U.S. patent application Ser. No. 15/953,404 filed on Apr. 14, 2018, issued as U.S. Pat. No. 10,785,795 dated Sep. 22, 2020, which is a continuation of International Patent Application No. PCT/KR2016/011854 filed on Oct. 20, 2016, which claims the priority to Korean Patent Application No. 10-2015-0146203 filed in the Korean Intellectual Property Office on Oct. 20, 2015, Korean Patent Application No. 10-2015-0150311 filed in the Korean Intellectual Property Office on Oct. 28, 2015, Korean Patent Application No. 10-2015-0154100 filed in the Korean Intellectual Property Office on Nov. 3, 2015, Korean Patent Application No. 10-2016-0029975 filed in the Korean Intellectual Property Office on Mar. 12, 2016, Korean Patent Application No. 10-2016-0044465 filed in the Korean Intellectual Property Office on Apr. 11, 2016 and Korean Patent Application No. 10-2016-0062425 filed in the Korean Intellectual Property Office on May 20, 2016, the entire contents of which are incorporated herein by reference.

TECHNICAL FIELD

The present invention relates to a wireless communication method and a wireless communication terminal in a high-density environment including an overlapped basic service set.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel Therefore, required is a technology capable of efficiently using bandwidths by simultaneously transmitting data between a plurality of terminals and base terminals.

DISCLOSURE

Technical Problem

An object of the present invention is to provide a wireless communication method and a wireless communication terminal in a high-density environment including an overlapped basic service set.

Technical Solution

According to an embodiment of the present invention, a wireless communication terminal that communicates wirelessly includes: a transceiver; and a processor, wherein the processor is configured to receive a signaling field of a first PLCP Protocol Data Unit (PPDU) through the transceiver, and access a channel based on information identifying a Basic Service Set (BSS) indicated by the signaling field.

When a first determination on whether a BSS including the first PPDU is the same as a BSS including the wireless communication terminal based on the information identifying the BSS differs from a second determination on whether the BSS including the first PPDU is the same as the BSS including the wireless communication terminal based on an Address field of a MAC header included in the PPDU, the processor may be configured to access a channel based on the second determination, wherein the Address field of the MAC header may indicate a MAC address related to a MAC Protocol Data Unit (MPDU).

A size of a field indicating the information identifying the BSS may be smaller than a maximum number that the MAC address is able to have.

The processor may be configured to determine the BSS including the first PPDU based on at least one of a transmitting STA address (TA) field, a receiving STA address (RA) field, and a BSSID field of the Address field of the MAC header.

When the first PPDU includes a trigger frame transmitted from a BSS different from the BSS including the wireless communication terminal, the processor may be configured to measure a received signal strength of the first PPDU, and adjust a transmission power based on the received signal strength when transmitting a second PPDU after the transmission of the trigger frame is completed.

When transmitting the second PPDU while an uplink PPDU transmitted based on the trigger frame is transmitted, the processor may be configured to adjust a transmission power based on the received signal strength.

When transmitting the second PPDU during Transmission Opportunity (TXOP) indicated by the trigger frame, the processor may be configured to adjust a transmission power based on the received signal strength.

The signaling field of the first PPDU may include information indicating whether a Spatial Reuse (SR) operation is allowed, wherein the processor may be configured to adjust the transmission power based on the information indicating whether the SR operation is allowed.

The signaling field of the first PPDU may include information on a transmission power of the first PPDU.

A frequency band used by the wireless communication terminal may be divided into a primary channel and a secondary channel, and the processor may be configured to perform a CCA operation on each of the primary channel and the secondary channel.

The processor may be configured to use a Clear Channel Assessment (CCA) threshold different from a CCA threshold used in the primary channel, in the secondary channel.

The processor may determine that if a PPDU is not transmitted in the primary channel, a PPDU transmitted from the secondary channel is transmitted from a BSS different from the BSS including the wireless communication terminal.

According to an embodiment of the present invention, an operating method of a wireless communication terminal that communicates wirelessly includes: receiving a signaling field of a first PLCP Protocol Data Unit (PPDU); and accessing a channel based on information identifying a Basic Service Set (BSS) indicated by the signaling field.

The accessing of the channel may include, when a first determination on whether a BSS including the first PPDU is the same as a BSS including the wireless communication terminal based on the BSS color differs from a second determination on whether the BSS including the first PPDU is the same as the BSS including the wireless communication terminal based on an Address field of a MAC header included in the PPDU, accessing a channel based on the second determination, wherein the Address field of the MAC header may indicate a MAC address related to a MAC Protocol Data Unit (MPDU).

A size of a field indicating the information identifying the BSS may be smaller than a maximum number that the MAC address is able to have.

The accessing of the channel based on the second determination may include determining the BSS including the first PPDU based on at least one of a transmitting STA address (TA) field, a receiving STA address (RA) field, and a BSSID field of the Address field of the MAC header.

The first PPDU may include a trigger frame transmitted from a BSS different from the BSS including the wireless communication terminal, and the method may further include measuring a received signal strength of the first PPDU, and adjusting a transmission power based on the received signal strength when transmitting a second PPDU after the transmission of the trigger frame is completed.

The transmitting of the second PPDU may include, when transmitting the second PPDU while an uplink PPDU transmitted based on the trigger frame is transmitted, adjusting a transmission power based on the received signal strength.

The signaling field of the first PPDU may include information indicating whether a Spatial Reuse (SR) operation is allowed, and the transmitting of the second PPDU may include adjusting the transmission power based on the information indicating whether the SR operation is allowed.

The signaling field of the first PPDU may include information on a transmission power of the first PPDU.

Advantageous Effects

An embodiment of the present invention is to provide a wireless communication method and a wireless communication terminal in a dense environment including an overlapped basic service set.

DESCRIPTION OF DRAWINGS

FIGS. 13 and 14 show SR and power save operations of a wireless communication terminal according to the type of PPDU and whether it is an OBSS when the wireless communication terminal according to the embodiment of the present invention receives the PPDU.

MODE FOR CARRYING OUT THE INVENTION

Figure 1:
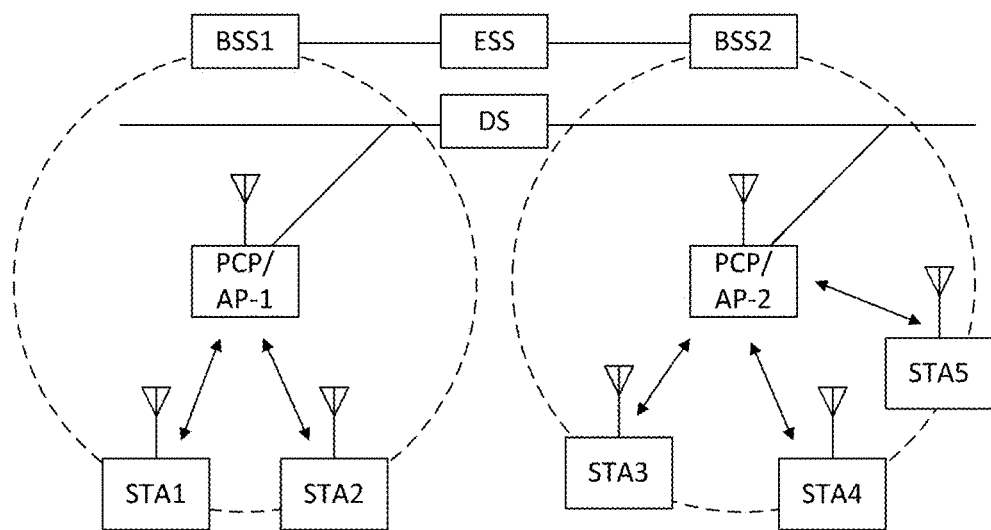
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2015-0146203 (2015.10.20), Nos. 10-2015-0150311 (2015.10.28), 10-2015-0154100 (2015.11.03), 10-2016-0029975 (2016.03.12), 10-2016-0044465 (2016.04.11), and 10-2016-0062425 (2016.05.20) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
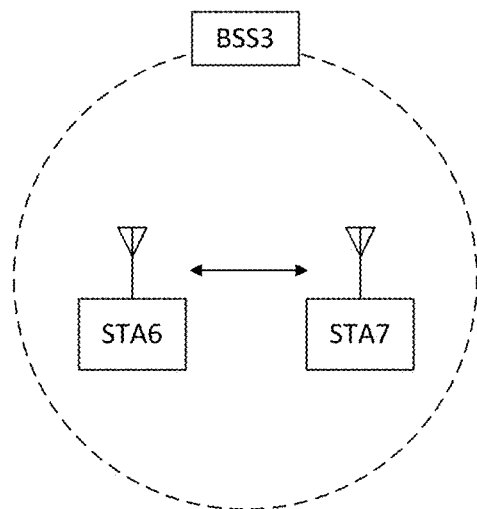
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
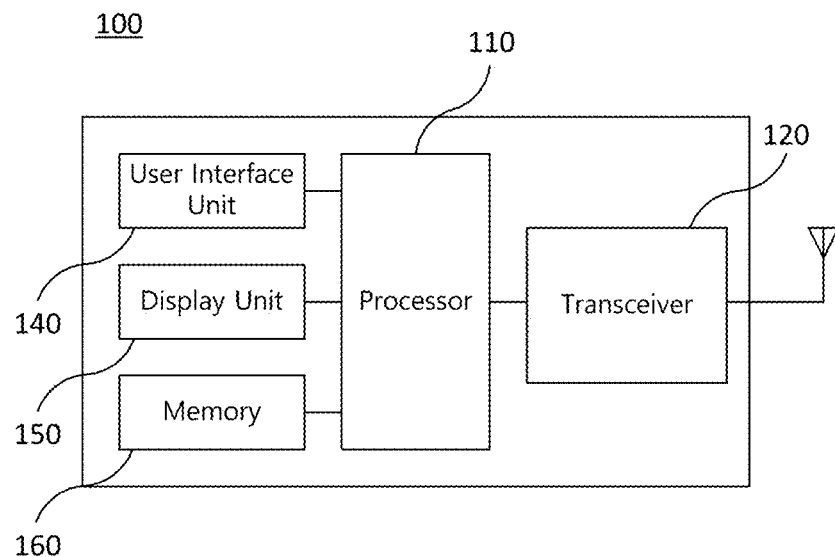
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
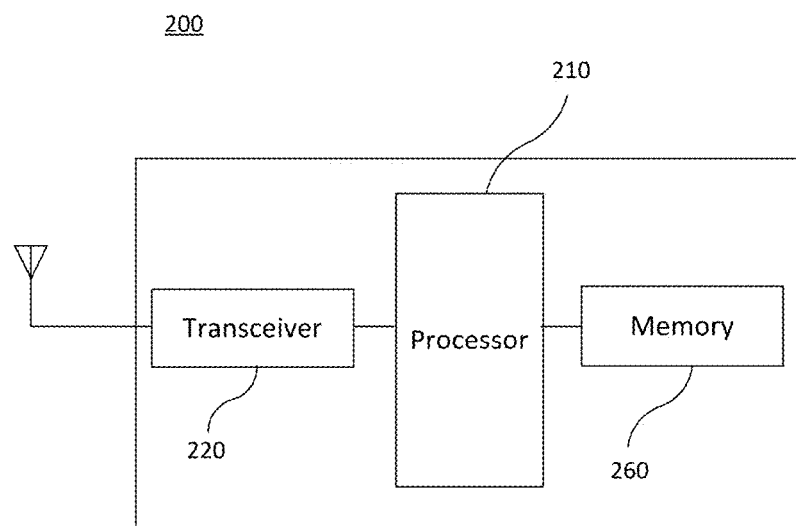
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
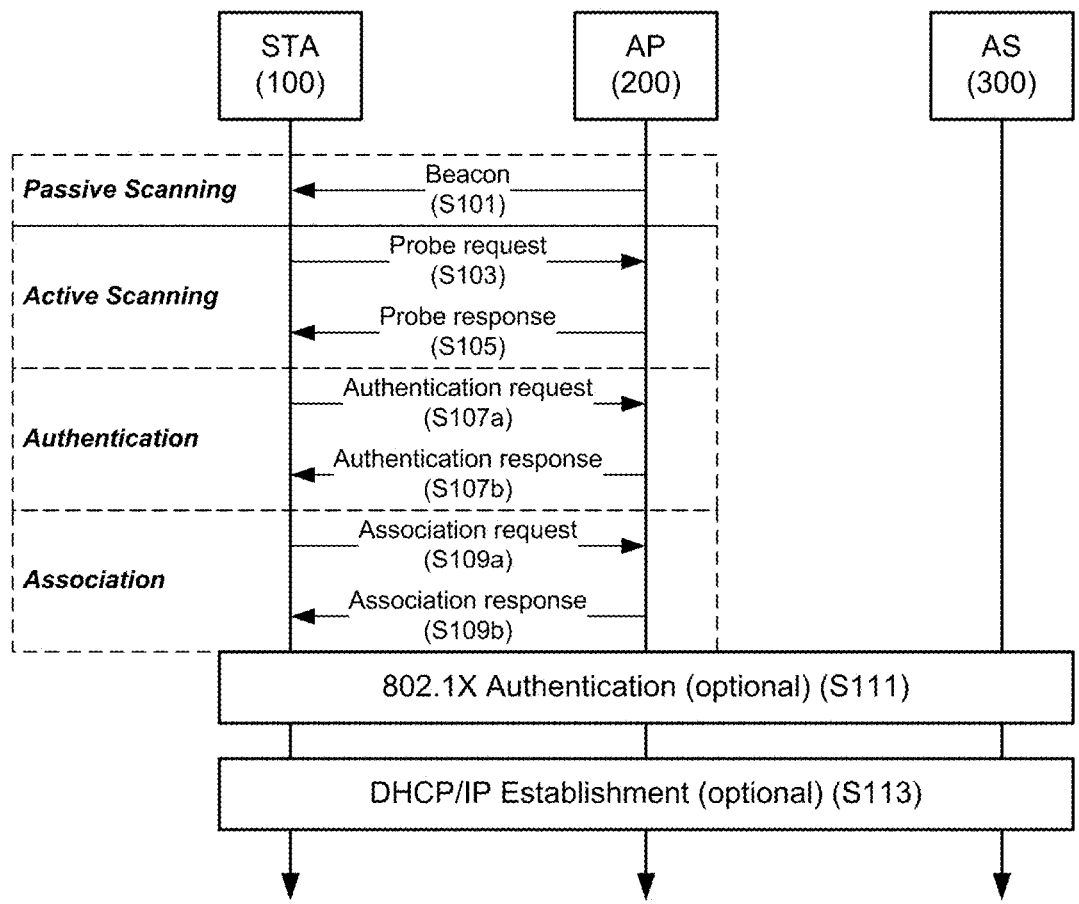
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Due to the spread of mobile devices and the supply of wireless communication, wireless communication terminals are increasingly communicating in a dense environment. Particularly, the number of cases where a wireless communication terminal communicates in an environment in which a plurality of BSSs are overlapped is increasing. When multiple BSSs are overlapped, the communication efficiency of the wireless communication terminal may be degraded due to interference with other wireless communication terminals. In particular, when a frequency band is used through a contention procedure, a wireless communication terminal may not obtain even a transmission opportunity due to interference with other wireless communication terminals. To solve this problem, a wireless communication terminal may perform a spatial reuse (SR) operation. Specifically, the SR operation may include an operation of accessing the channel depending on whether the received frame is a frame transmitted from a BSS including a wireless communication terminal or a frame transmitted from another BSS. In a specific embodiment, the operation of accessing the channel may include a CCA operation and a deferral operation. For example, the wireless communication terminal may adjust a Clear Channel Assessment (CCA) threshold according to whether a frame received by the wireless communication terminal is a frame transmitted from a BSS including the wireless communication terminal or a frame transmitted from an OBSS. Also, the wireless communication terminal may adjust the transmission power of the PPDU to be transmitted according to the result of the CCA operation in the SR operation. An embodiment for an SR operation of the wireless communication terminal will be described with reference to FIGS. 6 to 23.

For convenience of explanation, a BSS including a wireless communication terminal is referred to as Intra-BSS, and a basic service set overlapped with Intra-BSS is referred to as an Overlapped Basic Service Set (OBSS). In addition, a frame transmitted in the Intra-BSS is referred to as an Intra-BSS frame, and a frame transmitted in the OBSS is referred to as an OBSS frame or an Inter-BSS frame.

Figure 6:
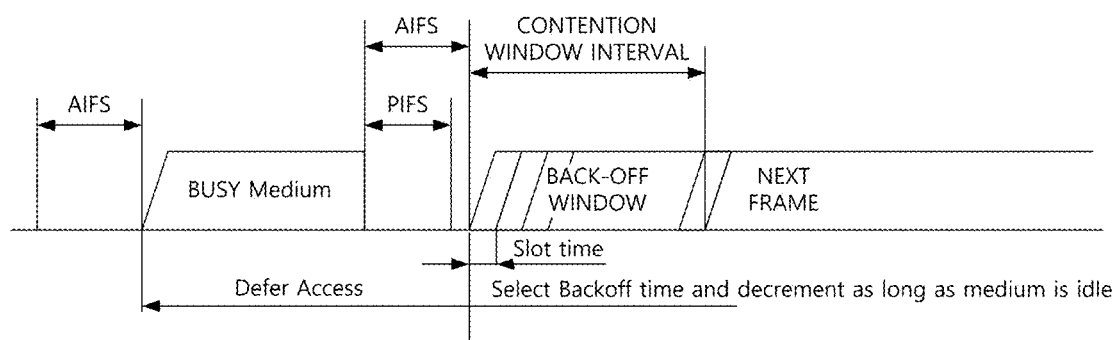
FIG. 6 shows the wireless communication terminal according to an embodiment of the present invention accessing a wireless medium through a contention procedure.

FIG. 6 shows the wireless communication terminal according to an embodiment of the present invention accessing a wireless medium through a contention procedure.

The wireless communication terminal performs a carrier sensing in a channel through which data is to be transmitted before transmitting data. The wireless communication terminal determines that the corresponding channel is busy when a wireless signal of a predetermined strength or more is detected. When a channel is busy, the wireless communication terminal defers access to that channel. This operation is referred to as Clear Channel Assessment (CCA). In addition, a criterion for determining whether a wireless communication terminal senses a wireless signal is referred to as a CCA threshold. Specifically, when the wireless communication terminal detects a wireless signal having a CCA threshold or less, the wireless communication terminal may determine that the corresponding channel is idle.

When the channel is idle for a predetermined time period or longer, the wireless communication terminal may perform a contention procedure according to a backoff window. At this time, the predetermined time interval may be any one of InterFrame Space (IFS) defined in 802.11. For example, the predetermined time interval may be one of Arbitration InterFrame Space (AIFS) and PCF InterFrame Space (PIFS). Specifically, the wireless communication terminal may acquire random value in the contention window as a backoff counter. At this time, when the idle time of the corresponding channel continues for a slot time or longer, the wireless communication terminal decreases the value of the backoff counter. At this time, the slot time may be 9 us. The wireless communication terminal waits until the backoff counter value becomes 0. When the value of the backoff counter becomes 0, the wireless communication terminal accesses the corresponding channel. The time interval in which the wireless communication terminal decrease the value of the backoff counter and waits is referred to as a contention window interval.

The wireless communication terminal accesses the channel and then transmits the data. When a channel access of a wireless communication terminal collision with a channel access of another wireless communication terminal, the wireless communication terminal acquires an random number again in the contention window and performs the contention procedure. At this time, the wireless communication terminal may adjust the value of the contention window to twice the previous size.

Also, the channel may become busy before the value of the backoff counter becomes 0. When the channel is busy before the value of the backoff counter reaches 0, in a case where the channel is idle again and idle for more than a certain time interval, the wireless communication terminal may perform the contention procedure again according to the backoff window. At this time, the wireless communication terminal may perform the backoff procedure based on the remaining backoff counter value in the previous contention procedure.

Through the above-described CCA procedure, the wireless communication terminal may avoid a collision that occurs when a plurality of wireless communication terminals access the same channel. However, if there are too many wireless communication terminals in a narrow range and a plurality of OBSSs exist, a low degree of signal interference may continuously occur. Therefore, it may be inefficient to perform the same CCA operation and the deferral operation without distinguishing whether the signal is transmitted from the OBSS or the BSS. Therefore, the wireless communication terminal needs to efficiently use the wireless resources through the SR operation. Specifically, the wireless communication terminal needs to perform CCA and deferral operations according to whether the received frame is an Inter-BSS frame or an Intra-BSS frame. To this end, when the wireless communication terminal transmits a frame, a method of signaling the BSS including the wireless communication terminal is required. This will be described with reference to FIGS. 7 and 8.

Figure 7:
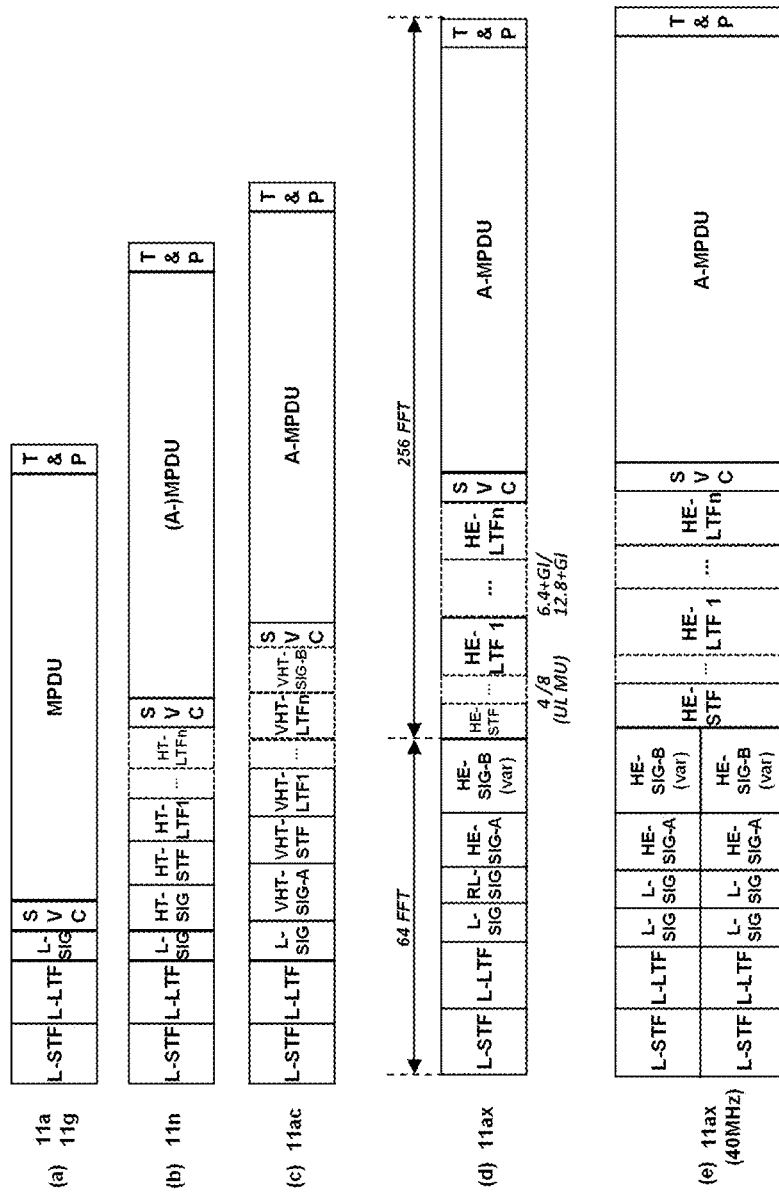
FIG. 7 shows a PPDU format used in a wireless communication method according to an embodiment of the present invention.

FIG. 7 shows a PPDU format used in a wireless communication method according to an embodiment of the present invention.

FIG. 7(a) shows a PLCP Protocol Data Unit (PPDU) format according to the 802.11a/11g standard. Also, FIG. 7(b) shows the PPDU format according to the 802.11n standard. FIG. 7(c) shows the PPDU format according to the 802.11ac standard. FIGS. 7(d) and 7(e) show a PPDU format according to an embodiment of the present invention. FIG. 7(d) shows a case where the PPDU is transmitted through a frequency band having a bandwidth of 20 MHz, and FIG. 7(e) shows a case where the PPDU is transmitted through a frequency band having a 40 MHz bandwidth.

A PPDU according to an exemplary embodiment of the present invention is divided into an L-STF, an L-LTF, an L-SIG field, an RL-SIG field, an HE-SIG-A field, an HE-SIG-B field, an HE-STF, an HE-LTF, an SVC field, a data field, and a Tail & Padding (T&P) field. The wireless communication terminal performs the OFDM transmission for the L-STF, the L-LTF, the L-SIG field, the RL-SIG field, the HE-SIG-A field, and the HE-SIG-B field based on 64 FFT. Also, the wireless communication terminal performs the OFDM transmission for the HE-STF, the HE-LTF, the SVC field, the data field, and the Tail&Padding (T&P) field based on 256 FFT.

The L-SIG field signals information that may be decoded by a legacy wireless communication terminal that does not support embodiments of the present invention. L-STF and L-LTF are training signals used for L-SIG field reception. The legacy wireless communication terminal performs Automatic Gain Control (AGC) and Frequency Offset Detection (FOD) based on L-STF and L-LTF. The RL-SIG field signals the PPDU according to an embodiment of the present invention in a form in which the L-SIG field is repeated. The HE-SIG-A and HE-SIG-B fields signal information on the PPDU. HE-STF and HE-LTF are training signals for data field reception. The wireless communication terminal may estimate the channel through which the PPDU is transmitted based on the HE-STF and the HE-LTF, and may perform AGC and FOD. Also, the HE-LTF may be transmitted in a variable number according to the number of spatial streams. HE-LTF may be divided into HE-LTF-short and HE-LTF-long depending on the application. HE-LTF-short is used in communication in indoor environment and has a duration equivalent to the sum of 6.4 us and a guard interval, and HE-LTF-long is used for communication in outdoor environment and has a duration equivalent to the sum of 12.8 us and a guard interval.

The data field indicates data included in the PPDU. At this time, the data may be A-MPDU. The SVC field indicates the start of the data field. Padding in the Tail & Padding (T&P) field indicates a padding bit when padding is required for symbol-by-symbol transmission. In the Tai &Padding (T&P) field, Tail is present when the PPDU is protected by a convolutional code.

The HE-SIG-A field contains information for decoding the PPDU. Specifically, when the PPDU includes the HE-SIG-B field, the HE-SIG-A field includes a length of the HE-SIG-B field and information on Modulation and Coding Scheme (MCS) of the signal including the HE-SIG-B field. In addition, the HE-SIG-A field may include an indicator indicating whether the transmission of the PPDU corresponds to the downlink transmission or the uplink transmission. In addition, the HE-SIG-A field may include information for identifying the BSS to which the wireless communication terminal that transmitted the PPDU belongs. At this time, the information identifying the BSS may be a BSS color. Specifically, the size of the field indicating the BSS color may be smaller than the maximum number that the BSS identifier (BSSID) may have. Since the number of symbols that transmit the HE-SIG-A field is fixed at 2, the size of the field that may be used to represent the BSS color may be limited. In this case, the BSSID may be the MAC address of the access point included in the BSS.

The BSS color may be set through various embodiments. Specifically, the wireless communication terminal may set the BSS color based on the MAC address of the connected access point. In a specific embodiment, the wireless communication terminal may set the BSS color using the MAC address of the associated access point and any unidirectional function. According to this embodiment, the access point may omit a separate operation of signaling the BSS color set to the wireless communication terminal associated to the access point. However, if the size of the field indicating the BSS color is smaller than the maximum number that the MAC address may have, the different BSSs may be set to the same BSS color even if the MAC address of the access point is unique.

In another specific embodiment, the access point may arbitrarily set the BSS color. At this time, the access point must separately signal the BSS color set to the wireless communication terminal associated with the access point. Specifically, the access point may signal the BSS color through a separate message to the wireless communication terminal associated with the access point. Also, the wireless communication terminal may obtain the value of the BSS color from the PPDU transmitted by the access point. As in the previous embodiments, if the size of the field indicating the BSS color is smaller than the maximum number that the MAC address may have, even if the MAC address of the access point is unique, different BSSs may have the same BSS color value.

If the PPDU including the HE-SIG-B field is for a downlink Multi User (MU), the HE-SIG-B field may signal resource allocation information for each user. In addition, the HE-SIG-B field may have a variable length. Specifically, the number of symbols transmitting the HE-SIG-B field may be variable.

As described above, the signaling field of the PPDU may include information for identifying the BSS including the wireless communication terminal that transmitted the PPDU. Therefore, the wireless communication terminal may identify the BSS to which the wireless communication terminal that transmitted the PPDU through the signaling field of the PPDU belongs. Specifically, the wireless communication terminal may determine whether the PPDU received based on the signaling field of the PPDU is the PPDU transmitted from the BSS to which the wireless communication terminal belongs or the PPDU transmitted from the OBSS. For example, the wireless communication terminal may determine whether the PPDU received based on the BSS color field of the HE-SIG-A field is the PPDU transmitted from the BSS to which the wireless communication terminal belongs or the PPD transmitted from the OBSS. The identification, by the wireless communication terminal, of the BSS including a wireless communication terminal which transmitted the PPDU through the MAC header will be described with reference to FIG. 8.

Figure 8:
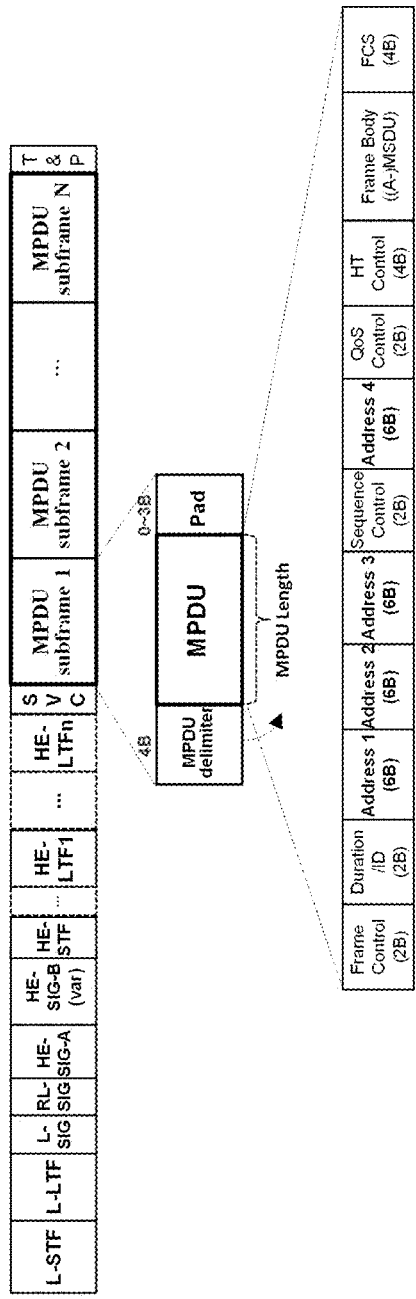
FIG. 8 shows an A-MPDU format used in a wireless communication method according to an embodiment of the present invention.

FIG. 8 shows an A-MPDU format used in a wireless communication method according to an embodiment of the present invention.

The A-MPDU is an aggregate of a plurality of MPDUs. The A-MPDU may include up to 64 MPDUs. This is because the number of MDPUs that may be represented by the bitmap of the compressed block ACK is 64. The A-MPDU includes a delimiter for dividing a plurality of MPDUs and a pad for padding. The delimiter includes an End-Of-Frame (EOF) field indicating whether the corresponding MPDU is the last MPDU among a plurality of MPDUs included in the A-MPDU, an MPDU Length field indicating the length of the MPDU, a CRC field used to check whether the MPDU contains errors, and a signature field.

The individual MPDU includes a frame body including data transmitted by the MPDU, a MAC header for signaling information on the MPDU, and an FCS field used for determining whether the MPDU includes an error. At this time, the frame body may be a MAC Service Data Unit (MSDU) or an A-MSDU, which is an aggregate of a plurality of MSDUs. In addition, the MAC header may include a plurality of Address fields indicating a MAC address associated with the MPDU. Specifically, the MAC header may include four Address fields. The plurality of Address fields may include at least one of a BSSID field indicating a BSSID identifying the BSS from which the corresponding MPDU is transmitted, a transmitting STA address (TA) field indicating a MAC address of the wireless communication terminal transmitting the MPDU, and a receiving STA address (RA) field indicating a MAC address of the wireless communication terminal receiving the MPDU. In this case, the BSSID may be the MAC address of the access point. When an access point transmits or receives an MPDU, one of a plurality of Address fields may indicate a MAC address of the access point. In addition, the MAC header may include a BSSID field depending on the type of the frame. Therefore, the wireless communication terminal may determine whether the MPDU received based on the MAC header is an Inter-BSS frame or an Intra-BSS frame. Specifically, the wireless communication terminal may determine whether the received MPDU is an Inter-BSS frame or an Intra-BSS frame based on the Address field of the MAC header. For example, when the RA field and the TA field of the received MPDU indicate the MAC address of the access point to which the wireless communication terminal is associated, the wireless communication terminal may determine the received MPDU as an Intra-BSS frame.

The wireless communication terminal may perform the SR operation based on whether the corresponding MPDU is an Inter-BSS frame or an Intra-BSS frame. In addition, the wireless communication terminal may perform a power save operation based on whether the MPDU is an Inter-BSS frame or an Intra-BSS frame. In order to determine whether the MPDU received by the wireless communication terminal based on the MAC header is an Inter-BSS frame, the MPDU must be completely received and the FCS field must be decoded. Therefore, when the wireless communication terminal receives the PPDU including only one MPDU, it may be difficult to perform the SR operation and the power save operation based on the MAC header. When the wireless communication terminal receives the PPDU including the A-MPDU, the wireless communication terminal determines whether the first MPDU of the A-MPDU is an Inter-BSS frame based on the MAC header, and performs the SR operation and the power save operation during the transmission duration of the remaining MPDUs according to whether the first MPDU of the A-MPDU is the Inter-BSS frame.

In addition, when the wireless communication terminal determined that the MPDU received by the wireless communication terminal is an Intra-BSS frame or an Inter-BSS frame, the determination based on the BSS color indicated by the signaling field of the PPDU may differ from the determination based on the Address field of the MAC header. At this time, the wireless communication terminal may determine whether the MPDU is an Intra-BSS frame or an Inter-BSS frame according to the Address field of the MAC header. Specifically, even if the BSS color indicated by the signaling field of the PPDU is the same as the BSS color corresponding to the BSS including the wireless communication terminal, when the value of the Address field of the MAC header corresponding to the MAC address of the access point is not the MAC address of the access point to which the wireless communication terminal is associated, the wireless communication terminal may determine the received MPDU as an Inter-BSS frame. In addition, even if the BSS color indicated by the signaling field of the PPDU is different from the BSS color corresponding to the BSS including the wireless communication terminal, when the value of the Address field of the MAC header corresponding to the MAC address of the access point is the MAC address of the access point to which the wireless communication terminal is associated, the wireless communication terminal may determine the received MPDU as an Intra-BSS frame.

When the wireless communication terminal receives a wireless signal, the wireless communication terminal may process the received signal in a physical layer and a MAC layer. At this time, the interface between the physical layer and the MAC layer is referred a primitive. In addition, the operation of the physical layer of the wireless communication terminal may be performed by the PHY Sublayer Management Entity (PLME). In addition, the operation of the MAC layer of the wireless communication terminal may be performed by the MAC Sublayer Management Entity (MLME). An operation in which a wireless communication terminal receives a PPDU transmitted from a BSS including a wireless communication terminal and a PPDU transmitted from an OBSS via a primitive will be described with reference to FIGS. 9 to 11.

Figure 9:
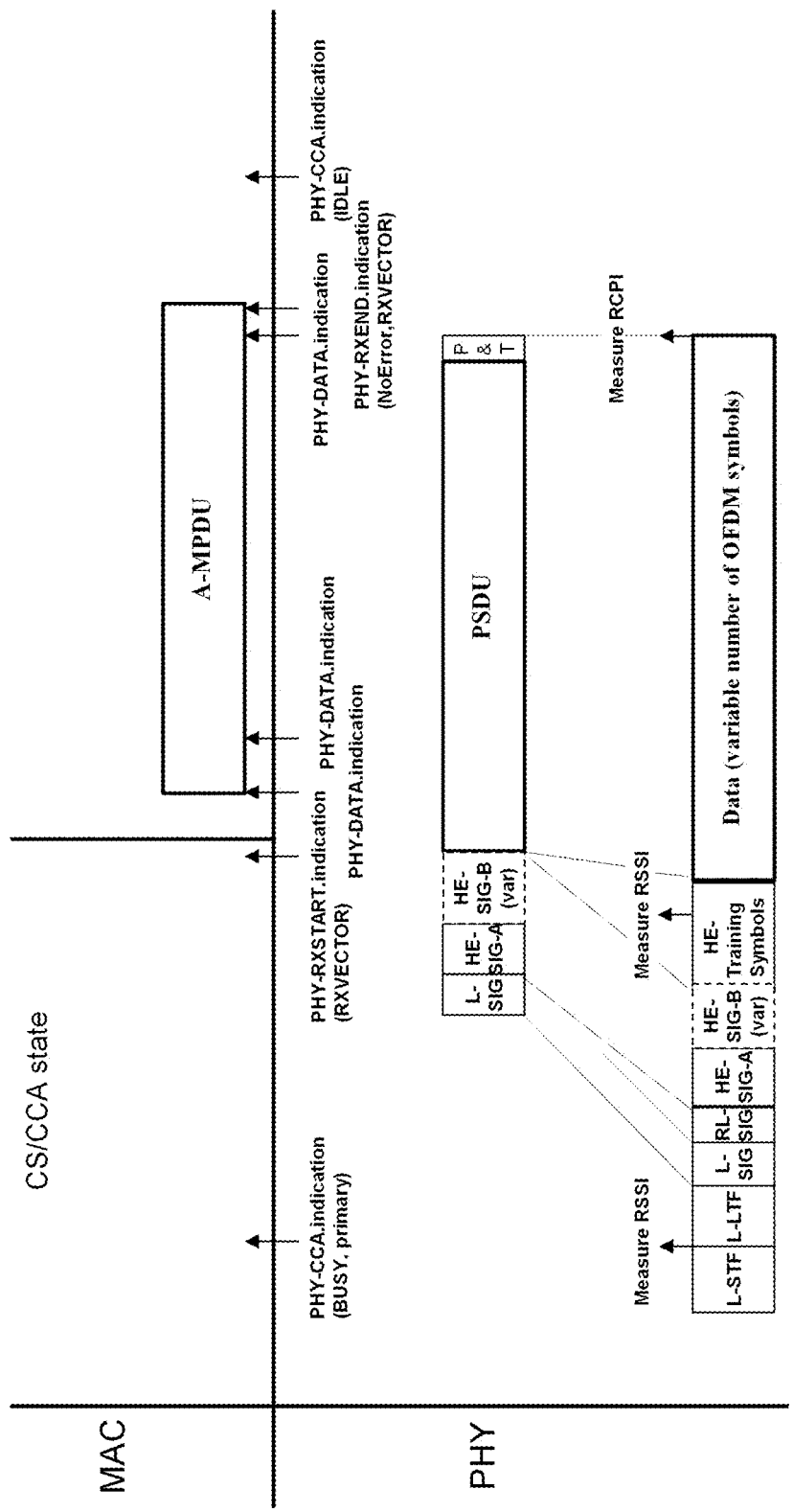
FIG. 9 shows an operation of a wireless communication terminal when the wireless communication terminal according to an embodiment of the present invention receives a PPDU indicating a BSS color corresponding to a BSS including a wireless communication terminal.

FIG. 9 shows an operation of a wireless communication terminal when the wireless communication terminal according to an embodiment of the present invention receives a PPDU indicating a BSS color corresponding to a BSS including a wireless communication terminal.

When the wireless communication terminal receives the preamble of the PPDU, the wireless communication terminal measures the received signal strength indicator (RSSI) and starts receiving the PPDU. The start of signal reception may be reported by the PHY-CCA.indication (BUSY, channel-list) primitive from the physical layer of the wireless communication terminal to the MAC layer. At this time, the channel-list parameter may be used to indicate a channel determined to be busy by the CCA when the wireless communication terminal uses a frequency bandwidth having a bandwidth greater than 20 MHz.

Upon receiving the PHY-CCA.indication from the physical layer, the wireless communication terminal receives the symbol for transmitting the L-LTF of the PPDU and receives the L-SIG field. The wireless communication terminal decodes the L-SIG field to determine the length of the PPDU. If the parity value of the L-SIG field is invalid, the wireless communication terminal receives the PHYRX-END.indication (FormatViolation) primitive from the physical layer.

When the parity value of the L-SIG field is valid and the CRC and other fields of the HE-SIG-A field are also valid, the wireless communication terminal determines that the BSS color indicated by the HE-SIG-A is the same as the BSS color of the BSS including the wireless communication terminal. As in the embodiment of FIG. 9, when the BSS color indicated by the HE-SIG-A field is the same as the BSS color of the BSS including the wireless communication terminal, the physical layer of the wireless communication terminal maintains the PHY-CCA.indication primitive in the BUSY state during the duration of the L_LENGTH field included in the L-SIG field.

After receiving the HE-SIG-A field, the wireless communication terminal receives the HE-SIG-B field and the HE training signal. At this time, the HE training signal may be HE-STF and HE-LTF. Depending on the PPDU transmission mode, the HE-SIG-B field may not be present. Specifically, when the PPDU is a Downlink (DL) Single User (SU) mode, the HE-SIG-B field may not exist.

When the PHY-RXSTART.indication (RXVECTOR) primitive is received from the physical layer, the MAC layer of the wireless communication terminal determines that the reception of the PPDU is started. At this time, the PHY-RXSTART.indication (RXVECTOR) primitive includes the received signal strength indicator (RSSI) value. However, the PPDU may be filtered out in the physical layer according to various conditions. At this time, the MAC layer of the wireless communication terminal receives the PHY-RX-END.indication (Filtered) primitive from the physical layer. Further, when the reception signal is lost before the end of reception of the PSDU, the MAC layer of the wireless communication terminal receives the PHY-RXEND.indication (CarrierLost) primitive from the physical layer. In this case, the MAC layer of the wireless communication terminal receives the PHY-CCA.indication (IDLE) primitive from the physical layer after the end of the corresponding PSDU.

When the physical layer of the wireless communication terminal successfully receives the PPDU, the physical layer of the wireless communication terminal combines and decodes the received PSDU bits in units of octets. The MAC layer of the wireless communication terminal receives the decoded PSDU from the physical layer via the PHY-DATA.indication (DATA) primitive. The wireless communication terminal may determine whether it is necessary to receive the MPDU based on the Address field of the MAC header.

When it is not necessary to receive the MPDU, the wireless communication terminal stops receiving the PPDU. When the wireless communication terminal does not need to receive the corresponding MPDU, it may be at least one of a case where the receiver address of the Address field of the corresponding MPDU is different from the MAC address of the wireless communication terminal, or a case where the corresponding MPDU is not a broadcast frame. Specifically, the MAC layer of the wireless communication terminal may stop the PPDU reception by transmitting the MAC-RXEND.request primitive to the physical layer.

When it is necessary to receive the MPDU, the wireless communication terminal continuously receives the PPDU. The physical layer of the wireless communication terminal transmits the PHY-RXEND.indication (NoError) primitive to the MAC layer after completing reception of the last bit of the PSDU, padding, and Tail. Thereafter, the physical layer of the wireless communication terminal enters the RX IDLE state.

Figure 10:
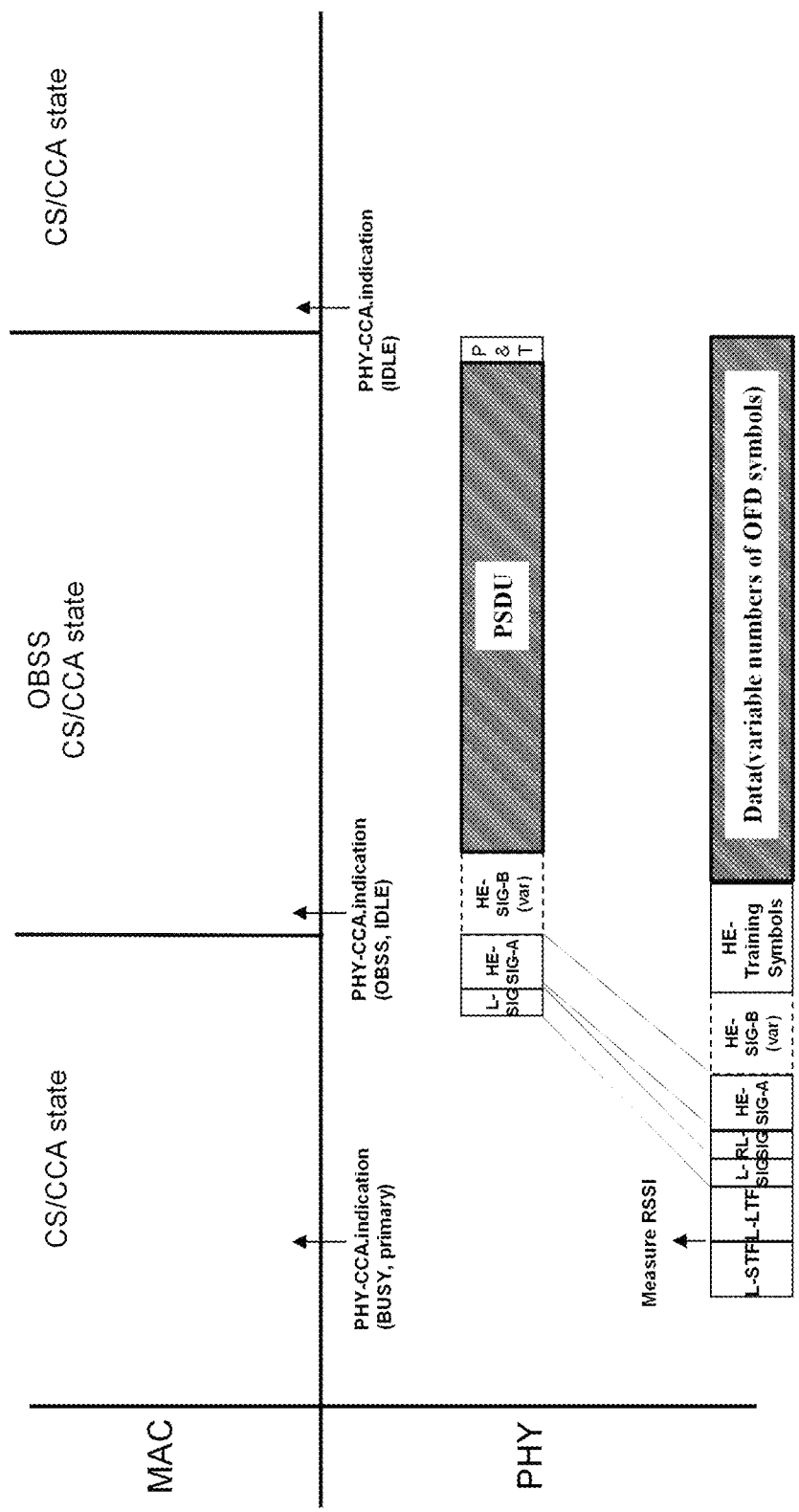
FIG. 10 shows an operation of a wireless communication terminal when the wireless communication terminal according to an embodiment of the present invention receives a PPDU indicating a BSS color corresponding to an OBSS.

FIG. 10 shows an operation of a wireless communication terminal when the wireless communication terminal according to an embodiment of the present invention receives a PPDU indicating a BSS color corresponding to an OBSS.

The wireless communication terminal may perform the SR operation when receiving the Inter-BSS frame as described above. Specifically, the wireless communication terminal may adjust the CCA threshold according to whether the frame received by the wireless communication terminal is an Intra-BSS frame or an Inter-BSS frame. Therefore, the wireless communication terminal may adjust the CCA threshold based on the BSS color indicated by the HE-SIG-A field. Specifically, the wireless communication terminal may decode the HE-SIG-A field as described with reference to FIG. 9. If the BSS color indicated by the HE-SIG-A field is different from the BSS color of the BSS including the wireless communication terminal, the wireless communication terminal may perform the CCA by applying the OBSS PD CCA threshold, which is the CCA threshold used for Preamble Detection (PD) of the PPDU transmitted from the OBSS. As in the embodiment of FIG. 10, when the strength of the received signal is smaller than the OBSS PD CCA threshold, the wireless communication terminal determines that the corresponding channel is idle. At this time, the physical layer of the wireless communication terminal may transmit the PHY-CCA.indication (OBSS, IDLE) primitive to the MAC layer. At this time, the physical layer of the wireless communication terminal may transmit the PHY-CCA.indication (OBSS, IDLE) primitive to the MAC layer. The wireless communication terminal may perform the CCA by applying the PD CCA threshold, which is the CCA threshold used for the PPDU PD transmitted from the BSS including the wireless communication terminal, from the time point when transmission of the PPDU transmitted from the OBSS is terminated. At this time, the OBSS PD CCA threshold may be larger than the PD CCA threshold.

According to the embodiment described with reference to FIG. 10, when another wireless communication terminal included in the same BSS determines that the BSS color indicated by the signaling field of the PPDU is a BSS color corresponding to the OBSS for some reason, the wireless communication terminal may not receive PPDUs transmitted by other wireless communication terminals included in the same BSS. Further, when the wireless communication terminal inaccurately determines the BSS color corresponding to the BSS including the wireless communication terminal, the wireless communication terminal may not receive PPDUs transmitted by other wireless communication terminals included in the same BSS. For convenience of explanation, the phenomenon that the wireless communication terminal does not receive PPDUs transmitted by other wireless communication terminals included in the same BSS due to BSS color confusion is referred to as intra-BSS color confusion.

As described above, since the size of the field indicating the BSS color is limited, different BSSs may be set to the same BSS color. In this case, the wireless communication terminal may apply the PD CCA threshold instead of the OBSS PD CCA threshold when a wireless communication terminal included in another BSS transmits a PPDU. For convenience of description, a case where different BSSs correspond to the same BSS color is referred to as Inter-BSS color collisions. Specific examples of Intra-BSS color confusion and Inter-BSS color collision are described in FIG. 11.

Figure 11:
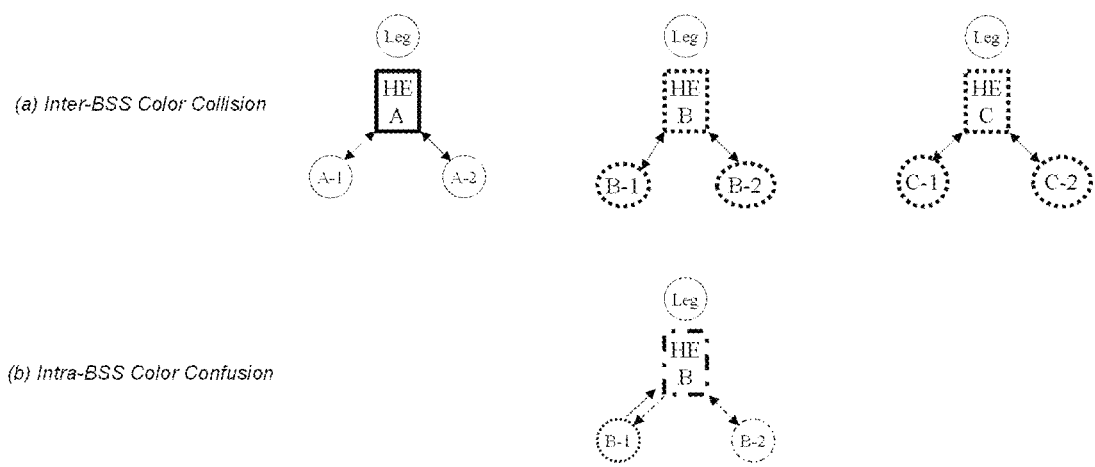
FIG. 11 shows a case where an inter-BSS color collision or an intra-BSS color confusion occurs.

FIG. 11 shows a case where an inter-BSS color collision or an intra-BSS color confusion occurs.

In the embodiment of FIG. 11(a), a first access point HE A, a second access point HE B, and a third access point HE C exist in one space. At this time, the second access point HE B and the third access point HE C may inadvertently select the same BSS color. At this time, the BSS operated by the second access point HE B and the BSS operated by the third access point HE C correspond to the same BSS color, resulting in an inter-BSS color collision.

In the embodiment of FIG. 11(b), the second access point HE B changes the BSS color to avoid Inter-BSS color collision. The second access point HE B may signal the BSS color change to the wireless communication terminal included in the BSS operated by the second access point HE B. At this time, if any one of the wireless communication terminals included in the BSS operated by the second access point HE B may not recognize the BSS color change, Intra-BSS color confusion occurs.

In order to prevent Intra-BSS color confusion and Inter-BSS color collisions, the wireless communication terminal may determine whether the received MPDU is an Intra-BSS frame or an Inter-BSS frame based on the Address field of the MAC header as well as the BSS color indicated by the signaling field of the PPDU. Specifically, when it is determined that the MPDU included in the received PPDU is an Intra-BSS frame or an Inter-BSS frame, if the determination based on the BSS color indicated by the HE-SIG-A field is different from the determination based on the Address field of the MAC header, the wireless communication terminal may determine whether the MPDU is an Intra-BSS frame or an Inter-BSS frame according to the Address field of the MAC header. This is because the MAC address of the wireless communication terminal is fixed for each wireless communication terminal and has a unique value, so that it is less likely that the BSS color is duplicated or confused. Therefore, the wireless communication terminal may determine whether intra-BSS color confusion and inter-BSS color collision occur based on the MAC header.

Specifically, the wireless communication terminal may determine whether Intra-BSS color confusion and Inter-BSS color collision occur based on the Address field of the MAC header. In the specific embodiment, even when Intra-BSS color confusion exists, when the strength of the received signal is greater than the OBSS PD CCA threshold, the wireless communication terminal waits without attempting transmission on the corresponding channel. At this time, the wireless communication terminal may check the Address field by decoding the MAC header included in the PPDU. The wireless communication terminal may determine whether intra-BSS color confusion occurs based on the Address field. Also, when the strength of the received signal is smaller than the OBSS PD CCA threshold, the wireless communication terminal may not attempt transmission immediately after decoding the signaling field of the PPDU and may attempt transmission after decoding the MAC header. Accordingly, the wireless communication terminal may decode the MAC header to identify the Address field, and determine whether Intra-BSS color confusion occurs based on the Address field.

In addition, in a specific embodiment, when the wireless communication terminal determines whether it is necessary to receive the MPDU based on the Address field of the MAC header, the wireless communication terminal may determine whether Intra-BSS color confusion and Inter-BSS color collision occur based on the Address field of the MAC header.

Figure 12:
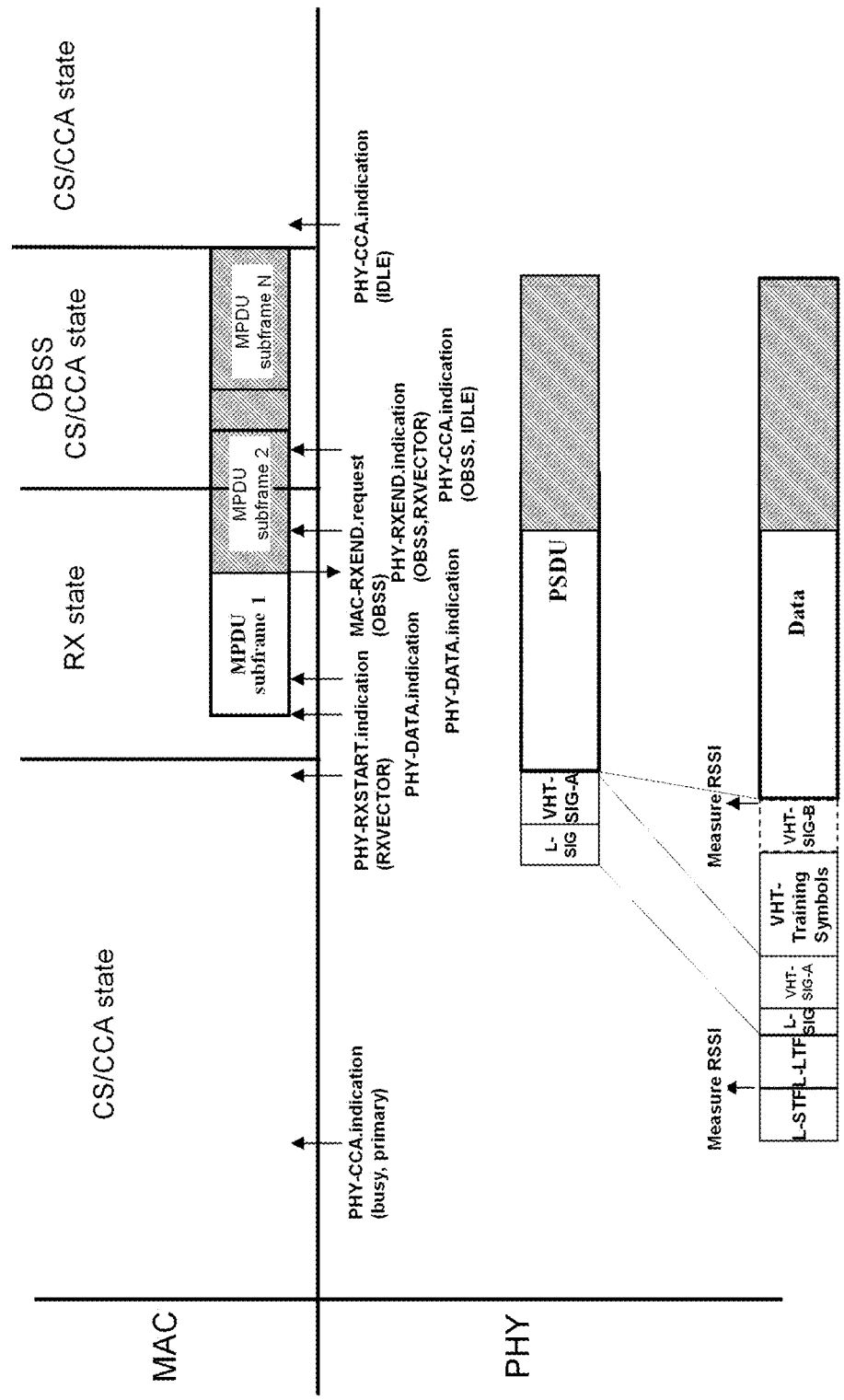
FIG. 12 shows an operation of a wireless communication terminal when the wireless communication terminal according to an embodiment of the present invention receives a legacy PPDU corresponding to an OBSS.

FIG. 12 shows an operation of a wireless communication terminal when the wireless communication terminal according to an embodiment of the present invention receives a legacy PPDU corresponding to an OBSS.

When the wireless communication terminal receives the legacy PPDU, the wireless communication terminal may perform the SR operation based on the Address field of the MAC header. This is because the signaling field of the legacy PPDU does not include the BSS color. The operation of the wireless communication terminal to receive the L-SIG field of the PPDU may be the same as the PPDU reception operation described with reference to FIGS. 9 and 10.

Specifically, when receiving the preamble of the PPDU, the wireless communication terminal measures the received signal strength indicator (RSSI) and starts receiving the PPDU. The start of signal reception may be reported by the PHY-CCA.indication (BUSY, channel-list) primitive from the physical layer of the wireless communication terminal to the MAC layer. At this time, the channel-list parameter may be used to indicate a channel determined to be busy by the CCA when the wireless communication terminal uses with a frequency bandwidth having a bandwidth greater than 20 MHz.

Upon receiving the PHY-CCA.indication from the physical layer, the wireless communication terminal receives the symbol for transmitting the L-LTF of the PPDU and receives the L-SIG field. The wireless communication terminal decodes the L-SIG field to determine the length of the PPDU. When the parity value of the L-SIG field is invalid, the wireless communication terminal receives the PHYRX-END.indication (FormatViolation) primitive from the physical layer.

When the parity value of the L-SIG field is valid, the wireless communication terminal receives the signaling field after the L-SIG field.

When the legacy PPDU is a VHT PPDU of the 802.11n standard, the wireless communication terminal receives the VHT-SIG-A field if the parity value of the L-SIG field is valid. Unlike the HE-SIG-A field, the VHT-SIG-A field does not contain a BSS color.

After receiving the VHT-SIG-A field, the wireless communication terminal receives VHT training signals, e.g., VHT-STF and VHT-LTF and VHT-SIG-B fields. Depending on the specific embodiment, the VHT-SIG-B field may not be present.

When the MAC layer of the wireless communication terminal receives the PHY-RXSTART.indication (RXVECTOR) primitive from the physical layer, the MAC layer of the wireless communication terminal determines that the reception of the PPDU is started. However, the physical layer of the wireless communication terminal may filter out PPDUs received according to various conditions. When the physical layer of the wireless communication terminal filters out the PPDU, the MAC layer of the wireless communication terminal receives the PHY-RXEND.indication (Filtered) primitive from the physical layer. Further, when the reception signal is lost before the end of reception of the PSDU, the MAC layer of the wireless communication terminal receives the PHY-RXEND.indication (CarrierLost) primitive from the physical layer. At this time, the MAC layer of the wireless communication terminal receives the PHY-CCA.indication (IDLE) primitive from the physical layer after the end of the corresponding PSDU.

When the wireless communication terminal normally receives the PPDU, the physical layer of the wireless communication terminal combines and decodes the received PSDU bits in units of octets. The MAC layer of the wireless communication terminal receives the decoded PSDU from the physical layer via the PHY-DATA.indication (DATA) primitive. If the PPDU includes an A-MPDU, the wireless communication terminal may determine whether the corresponding MPDU is an Intra-BSS frame or an Inter-BSS frame based on the Address field of the MAC header. Specifically, when the PPDU includes the A-MPDU, the FCS field of the first MPDU among the plurality of MPDUs included in the A-MPDU may be checked. If the FCS field is valid, the wireless communication terminal may determine whether the corresponding MPDU is an Intra-BSS frame or an Inter-BSS frame based on the Address field of the MAC header. In addition, the wireless communication terminal may determine whether it is necessary to receive the MPDU based on the Address field of the MAC header.

When the wireless communication terminal does not need to receive the MPDU, the wireless communication terminal stops receiving the PPDU. A case where the wireless communication terminal does not need to receive the corresponding MPDU may be at least one of a case where the corresponding MPDU is an Inter-BSS frame as in the embodiment of FIG. 12, a case where the receiver address of the address field of the MAC header of the MPDU is different from the MAC address of the wireless communication terminal, and a case where the MPDU is an Intra-BSS frame but not a broadcast frame. Specifically, the MAC layer of the wireless communication terminal may stop the PPDU reception by transmitting the MAC-RXEND.request primitive to the physical layer.

As in the embodiment of FIG. 12, when the corresponding MPDU is an Inter-BSS frame, the wireless communication terminal may perform the SR operation by applying the OBSS PD CCA threshold. Specifically, the wireless communication terminal may perform the CCA by applying the OBSS PD CCA threshold. As in the embodiment of FIG. 12, when the strength of the received signal is smaller than the OBSS PD CCA threshold, the wireless communication terminal determines that the corresponding channel is idle. At this time, the physical layer of the wireless communication terminal may deliver the PHY-CCA.indication (OBSS, IDLE) primitive to the MAC layer, and the MAC layer of the wireless communication terminal may receive the PHY-CCA.indication. (OBSS, IDLE) primitive. Also, the wireless communication terminal may perform the CCA by applying the PD CCA threshold from the time point when the transmission of the PPDU transmitted from the OBSS is terminated.

When the wireless communication terminal needs to receive the MPDU, the wireless communication terminal continuously receives the PPDU. A case where the wireless communication terminal needs to receive the corresponding MPDU may be at least one of a case where the receiver address of the Address field of the MAC header of the corresponding MPDU is the same as the MAC address of the wireless communication terminal and a case where the MPDU is an Intra-BSS frame and a broadcast frame. At this time, the MAC layer of the wireless communication terminal does not transmit the MAC-RXEND.request primitive to the physical layer. The physical layer of the wireless communication terminal transmits the PHY-RXEND.indication (NoError) primitive to the MAC layer after completing reception of the last bit of the PSDU, padding, and Tail. After transmitting the PHY-RXEND.indication (NoError) primitive, the physical layer of the wireless communication terminal enters the RX IDLE state.

FIGS. 13 and 14 show SR and power save operations of a wireless communication terminal according to the type of PPDU and whether it is an OBSS when the wireless communication terminal according to the embodiment of the present invention receives the PPDU.

FIG. 13(a) shows SR and power save operations of a wireless communication terminal when the wireless communication terminal according to an embodiment of the present invention receives a legacy PPDU.

When the wireless communication terminal receives the legacy PPDU, it may perform the SR and power save operations based on the MAC header. This is because the signaling field of the legacy PPDU does not contain information indicating the BSS from which the PPDU was transmitted. Specifically, when the wireless communication terminal receives the legacy PPDU, the wireless communication terminal may perform the SR and power save operations based on the Address field of the MAC header. In a specific embodiment, the wireless communication terminal may perform SR and power save operations based on the Address field of the MAC header of the first MPDU included in the A-MPDU.

When the first MPDU included in the A-MPDU is an Intra-BSS frame, the wireless communication terminal does not perform the SR operation. In addition, when the first MPDU included in the A-MPDU is an Intra-BSS frame, the wireless communication terminal may perform a power save operation depending on whether the MPDU is required to be received. Specifically, when the first MPDU included in the A-MPDU is an Intra-BSS frame and the wireless communication terminal does not need to receive the first MPDU included in the A-MPDU, the wireless communication terminal may enter the power save mode. Specifically, a case where the wireless communication terminal does not need to receive the first MPDU included in the A-MPDU may be at least one of a case where the receiver address of the address field of the MAC header of the first MPDU included in the A-MPDU is not the MAC address of the wireless communication terminal and a case where the first MPDU included in the A-MPDU is not a broadcast frame.

When the first MPDU included in the A-MPDU is an Inter-BSS frame, the wireless communication terminal may perform the SR operation. Specifically, the wireless communication terminal may perform the CCA by applying the OBSS PD CCA threshold after the first MPDU included in the A-MPDU. If the first MPDU included in the A-MPDU is an Inter-BSS frame, the wireless communication terminal may not be allowed to enter the power save mode.

FIGS. 13(b) to 13(d) shows SR and power save operations of a wireless communication terminal when the wireless communication terminal according to an embodiment of the present invention receives a non-legacy PPDU. When the wireless communication terminal receives the non-legacy PPDU, the wireless communication terminal may determine whether the MPDU included in the PPDU is an Intra-BSS frame or an Inter-BSS frame based on the BSS color indicated by the HE-SIG-A field of the PPDU. As described above, when the determination based on the BSS color indicated by the HE-SIG-A field and the determination based on the Address field of the MAC header are different, the wireless communication terminal may determine whether the MPDU included in the PPDU is an Intra-BSS frame or an Inter-BSS frame according to the Address field of the MAC header.

FIG. 13(b) shows SR and power save operations of a wireless communication terminal when the wireless communication terminal according to an embodiment of the present invention receives an UpLink (UL)/Downlink (DL) SU PPDU.

The wireless communication terminal may first determine whether the MPDU included in the PPDU is an Intra-BSS frame or an Inter-BSS frame based on the BSS color indicated by the HE-SIG-A field. When the BSS color indicated by the HE-SIG-A field is the same as the BSS color of the BSS including the wireless communication terminal, the wireless communication terminal determines the MPDU included in the PPDU as an Intra-BSS frame. When the BSS color indicated by the HE-SIG-A field is different from the BSS color of the BSS including the wireless communication terminal, the wireless communication terminal determines the MPDU included in the PPDU as an Inter-BSS frame. At this time, the wireless communication terminal may start the SR operation according to the determination whether the MPDU included in the PPDU determined based on the BSS color indicated by the HE-SIG-A field is the Intra-BSS frame or the Inter-BSS frame. In addition, the wireless communication terminal may start the power save operation according to the determination whether the MPDU included in the PPDU determined based on the BSS color indicated by the HE-SIG-A field is the Intra-BSS frame or the Inter-BSS frame.

However, the wireless communication terminal may determine whether the MPDU is an Intra-BSS frame or an Inter-BSS frame based on the Address field of the MAC header of the MPDU. The wireless communication terminal may change the SR operation according to whether the MPDU determined based on the Address field of the MAC header is an Intra-BSS frame or an Inter-BSS frame. In addition, the wireless communication terminal may change the power save operation according to whether the MPDU determined based on the Address field of the MAC header is an Intra-BSS frame or an Inter-BSS frame. If it is determined that the frame is an intra-BSS frame, the wireless communication terminal may determine whether the address of the address field of the MAC header of the MPDU is the same as the MAC address of the wireless communication terminal. If the receiver address of the Address field of the MAC header of the MPDU is the same as the MAC address of the wireless communication terminal, the wireless communication terminal receives the MPDU. When the receiver address of the Address field of the MAC header of the MPDU is different from the MAC address of the wireless communication terminal, the wireless communication terminal may enter the power save mode. Specifically, the wireless communication terminal may enter the power save mode, and may maintain the power save mode until the transmission of the PPDU is completed. At this time, the wireless communication terminal may determine whether the PPDU transmission is completed based on the L_LENGTH field of the L-SIG field. When the wireless communication terminal determines that the MPDU is an Inter-BSS frame, the wireless communication terminal performs the SR operation. The wireless communication terminal may perform the CCA by applying the OBSS PD CCA threshold. When the strength of the received signal is smaller than the OBSS PD CCA threshold, the wireless communication terminal determines that the corresponding channel is idle. When the wireless communication terminal determines that the MPDU is an Inter-BSS frame, the power save operation of the wireless communication terminal is not permitted.

FIG. 13(c) shows the SR operation and the power save operation of a wireless communication terminal when the wireless communication terminal according to the embodiment of the present invention receives a UL MU PPDU.

Since the UL MU PPDU is transmitted through MU-MIMO or OFDMA, it may be inefficient for other wireless communication terminals, except for the access point, which is the receiver of the UL MU PPDU, to receive the PSDU included in the UL MU PPDU. Therefore, the wireless communication terminal receiving the UL MU PPDU may perform the SR operation based on the BSS color indicated by the HE-SIG-A field without considering the Address field of the MAC header. In addition, the wireless communication terminal receiving the UL MU PPDU may perform the power save operation based on the BSS color indicated by the HE-SIG-A field without considering the Address field of the MAC header.

When the BSS color indicated by the HE-SIG-A field is the same as the BSS color of the BSS including the wireless communication terminal, the wireless communication terminal may not perform the SR operation. In addition, when the BSS color indicated by the HE-SIG-A field and the BSS color of the BSS including the wireless communication terminal are the same, the wireless communication terminal may perform the power save operation. Specifically, when the BSS color indicated by the HE-SIG-A field is the same as the BSS color of the BSS including the wireless communication terminal and the wireless communication terminal is not the access point that is the receiver of the UL MU PPDU, the wireless communication terminal enters the power save mode and maintains the power save mode until PPDU transmission is completed. At this time, the wireless communication terminal may determine whether the PPDU transmission is completed based on the L_LENGTH field of the L-SIG field.

When the BSS color indicated by the HE-SIG-A field is different from the BSS color of the BSS including the wireless communication terminal, the wireless communication terminal may perform the SR operation. Specifically, the wireless communication terminal may perform the CCA by applying the OBSS PD CCA threshold. When the BSS color indicated by the HE-SIG-A field is different from the color corresponding to the BSS including the wireless communication terminal, the wireless communication terminal may not be allowed to enter the power save mode.

FIG. 13(d) shows the SR operation and the power save operation of a wireless communication terminal when the wireless communication terminal according to the embodiment of the present invention receives the DL MU PPDU.

The user field of the HE-SIG-B field of the DL MU PPDU contains the Partial Association ID (Partial AID) of the wireless communication terminal receiving the PPDU. Therefore, the wireless communication terminal may determine whether Intra-BSS color confusion or Inter-BSS color collision occurs based on the Partial AID of the user field of the HE-SIG-B field. Specifically, the wireless communication terminal determines whether the PPDU is an Intra-BSS frame or an Inter-BSS frame based on the BSS color indicated by the HE-SIG-A field, and then, if the user field of the HE-SIG-B field indicates the Partial AID of the wireless communication terminal, may determine the PPDU as an Intra-BSS frame. In addition, when the BSS color indicated by the HE-SIG-A field is the same as the color of the BSS including the wireless communication terminal and the user field of the HE-SIG-B field does not indicate the Partial AID of the wireless communication terminal, the wireless communication terminal may enter the power save mode. However, only when the user field of the HE-SIG-B field indicates the Partial AID of the wireless communication terminal, since Intra-BSS color confusion or Inter-BSS color collision may be determined, through the HE-SIG-B field, only intra-BSS color confusion or inter-BSS color collision may be determined to be limited. Therefore, even when the wireless communication terminal determines whether Intra-BSS color confusion or Inter-BSS color collision occurs based on the Partial AID of the user field, the wireless communication terminal may again determine intra-BSS color confusion or inter-BSS color collision based on the Address field of the MAC header.

When the wireless communication terminal is an access point, the wireless communication terminal may determine whether Intra-BSS color confusion or Inter-BSS color collision occurs through a variety of methods than when the wireless communication terminal other than an access point. Specifically, when the access point receives the DL SU/MU PPDU indicating the same BSS color as the BSS color of the BSS including the access point, the access point may determine that an inter-BSS color collision occurs.

Also, when the access point receives a UL SU/MU PPDU that indicates the same BSS color as the BSS color of the BSS containing the access point, as in the previously described embodiments, when the value of the receiver address field of the Address field of the MAC header is an address other than the MAC address of the access point, the access point may determine that an inter-BSS color collision occurs. In addition, when the access point receives the UL SU/MU PPDU indicating the same BSS color as the BSS color even though the access point does not transmit the trigger frame, the access point may determine that an inter-BSS color collision occurs. At this time, the trigger frame is a MAC frame for guiding transmission of the wireless communication terminal. Specifically, the trigger frame may include information on resources allocated to the wireless communication terminal by the access point. In a specific embodiment, the trigger frame may include information on a frequency band allocated to the wireless communication terminal by the access point.

Based on an indicator included in the PPDU described above and indicating whether the transmission of the PPDU corresponds to the downlink transmission or the uplink transmission, the wireless communication terminal may determine whether the received PPDU is an UL PPDU or a DL PPDU.

FIG. 14(a) shows the SR operation and the power save operation of a wireless communication terminal depending on whether Inter-BSS color collision or Intra-BSS color confusion occurs when the wireless communication terminal according to the embodiment of the present invention receives the DL/UL SU PPDU.

When the wireless communication terminal receives the legacy PPDU, the wireless communication terminal may perform the SR operation based on the Address field of the MAC header. In addition, since the legacy PPDU does not include the BSS color, Inter-BSS color collision does not occur.

When the wireless communication terminal receives the legacy PPDU, the wireless communication terminal may perform the SR operation based on the Address field of the MAC header. As described above, the wireless communication terminal may determine whether an inter-BSS color collision occurs based on the Address field of the MAC header, and may change the SR operation according to whether an inter-BSS color collision occurs. Specifically, when the value of the BSS color indicated by the signaling field of the PPDU is the same as the BSS color of the BSS including the wireless communication terminal and it is determined based on the Address field of the MAC header that the corresponding MPDU is an Inter-BSS frame, after receiving the first MPDU included in the PPDU, the wireless communication terminal may apply the OBSS PD CCA threshold to perform the CCA. At this time, when the strength of the received signal is smaller than the OBSS PD CCA threshold, the wireless communication terminal determines that the corresponding channel is idle. Accordingly, when the corresponding channel is idle for a predetermined time or more, the wireless communication terminal may access the corresponding channel. However, when the PPDU includes only one MPDU and it is determined that an inter-BSS color collision occurs based on the MAC header, the wireless communication terminal may not perform the SR operation. There is a high possibility that there is no MPDU remaining to be received at the time point of decoding the MAC header of the MPDU. In addition, when the PPDU includes only one MPDU, it may include a case where the A-MPDU includes only one MPDU.

When the value of the BSS color indicated by the signaling field of the PPDU is different from the BSS color of the BSS including the wireless communication terminal and the MPDU is an Intra-BSS frame as a result of determination based on the Address field of the MAC header, the SR operation may be stopped. When the strength of the received signal is smaller than the OBSS PD CCA threshold and the wireless communication terminal accesses the corresponding channel, the wireless communication terminal may stop the transmission on the corresponding channel.

In addition, when the PPDU is transmitted from the BSS including the wireless communication terminal and the wireless communication terminal does not need to receive the MPDU included in the PPDU, the wireless communication terminal may perform the power save operation. Specifically, after receiving the first MPDU included in the PPDU, the wireless communication terminal may enter the power save mode. However, if the PPDU includes only one MPDU, the wireless communication terminal may not perform the power save operation. Also, when the PPDU is transmitted from the OBSS, the power save operation of the wireless communication terminal may not be permitted.

FIG. 14(b) shows the SR operation and the power save operation of a wireless communication terminal depending on whether Inter-BSS color collision or Intra-BSS color confusion occurs when the wireless communication terminal according to the embodiment of the present invention receives the DL/UL MU PPDU.

When the wireless communication terminal receives the non-legacy MU DL PPDU, it may perform a power save operation based on the address of the user field of the HE-SIG-B field. Specifically, when the BSS color indicated by the signaling field of the PPDU of the DL MU PPDU is the same as the BSS color of the BSS including the wireless communication terminal, and the Partial AID address is not included in the user field of the HE-SIG-B field of the DL MU PPDU, the wireless communication terminal may enter the power save mode. When the wireless communication terminal receives the non-legacy MU PPDU and the wireless communication terminal is not the receiver, the wireless communication terminal may not receive the PSDU included in the MU PPDU. Therefore, when the wireless communication terminal receives the non-legacy DL MU PPDU and the wireless communication terminal is not the receiver, the wireless communication terminal may not determine whether an inter-BSS color collision occurs.

Since the UL MU PPDU is transmitted through MU-MIMO or OFDMA, it may be inefficient for other wireless communication terminals, except for the access point, which is the receiver of the UL MU PPDU, to receive the PSDU included in the UL MU PPDU. Therefore, the wireless communication terminal receiving the UL MU PPDU may perform the SR operation and the power save operation based on the BSS color indicated by the HE-SIG-A field without considering the Address field of the MAC header. Specifically, when the BSS color indicated by the signaling field of the PPDU is the same as the BSS color of the BSS including the wireless communication terminal and the wireless communication terminal is not the access point that is the receiver of the UL MU PPDU, the wireless communication terminal enters the power save mode and maintains the power save mode until PPDU transmission is completed. At this time, the wireless communication terminal may determine whether the PPDU transmission is completed based on the L_LENGTH field of the L-SIG field.

As described above, when the wireless communication terminal receives the legacy PPDU transmitted to the MU-MIMO, it may be inefficient for the wireless communication terminal to receive the PSDU included in the PPDU. Therefore, when the wireless communication terminal receives the legacy PPDU transmitted to the MU-MIMO, the wireless communication terminal may not perform the SR operation. In addition, when the wireless communication terminal receives the legacy PPDU transmitted by the MU-MIMO, the wireless communication terminal may not perform the power save operation.

The operation of the other wireless communication terminal may be the same as the case of receiving the DL/UL SU PPDU described above.

It was described through FIGS. 6 to 14 that the wireless communication terminal according to the embodiment of the present invention performs the SR operation and the power save operation. In order for the wireless communication terminal according to the embodiment of the present invention to perform the SR operation and the power save operation, a method of determining whether the received frame is an Intra-BSS frame or an Inter-BSS frame has been described. A method for determining whether a frame received by a wireless communication terminal is an Intra-BSS frame or an Inter-BSS frame will be described through FIGS. 15 and 16.

Figure 15:
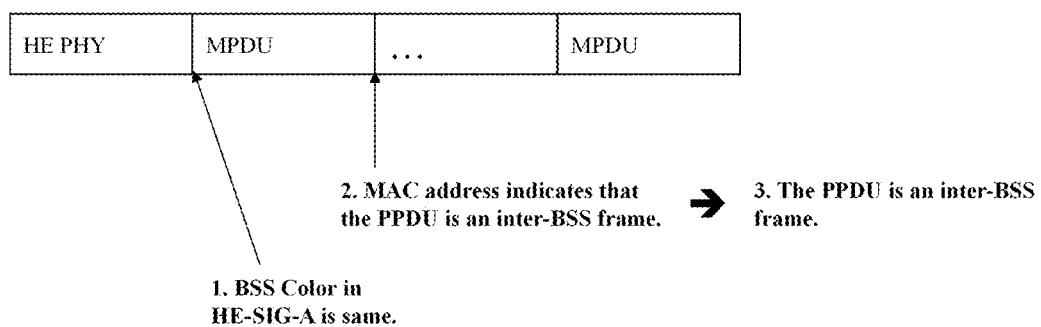
FIG. 15 shows a method of determining whether a frame received by a wireless communication terminal according to an embodiment of the present invention is an Intra-BSS frame or an Inter-BSS frame.

FIG. 15 shows a method of determining whether a frame received by a wireless communication terminal according to an embodiment of the present invention is an Intra-BSS frame or an Inter-BSS frame.

As described above, the wireless communication terminal may determine whether the received frame is an Intra-BSS frame or an Inter-BSS frame based on the BSS color indicated by the signaling field of the PPDU or the Address field of the MAC header. However, since the size of the field indicating the BSS color may be limited, different BSSs may have the same BSS color as described above. In addition, the MAC address value of the wireless communication terminal is unique. Therefore, when it is determined that the received frame is an Intra-BSS frame or an Inter-BSS frame based on the MAC address, the wireless communication terminal may accurately determine whether the received frame is an Intra-BSS frame or an Inter-BSS frame. Therefore, when the determination on whether the received frame is an Intra-BSS frame or an Inter-BSS frame based on the BSS color differs from the determination on whether the received frame is an Intra-BSS frame or an Inter-BSS frame based on the Address field of the MAC header, the wireless communication terminal may determine whether the received frame is an Intra-BSS frame or an Inter-BSS frame according to the Address field of the MAC header. Specifically, if the BSS color indicated by the signaling field of the PPDU including the received frame is the same as the BSS color of the BSS including the wireless communication terminal and the Address field of the MAC header of the received frame indicates an Inter-BSS frame, the wireless communication terminal may finally determine the received frame as an inter-BSS frame. In another specific embodiment, when the BSS color indicated by the signaling field of the PPDU including the received frame is different from the BSS color of the BSS including the wireless communication terminal and the Address field of the MAC header of the received frame indicates an Intra-BSS frame, the wireless communication terminal may finally determine the received frame as an intra-BSS frame.

When any one of the plurality of address fields of the MAC header of the frame received by the wireless communication terminal indicates the BSSID of the BSS including the wireless communication terminal, the wireless communication terminal may determine the received frame as an Intra-BSS frame. In addition, when any one of the plurality of address fields of the MAC header of the frame received by the wireless communication terminal does not indicate the BSSID of the BSS including the wireless communication terminal, the wireless communication terminal may determine the received frame as an Inter-BSS frame. However, depending on the type of the MAC frame, the wireless communication terminal may not be able to determine whether the received frame is an Intra-BSS frame or an Inter-BSS frame based on only the Address field. This is because the information indicated by the Address field of the MAC header may vary depending on the setting of the frame type, the To DS field, and the From DS field. Accordingly, the wireless communication terminal may determine whether the received frame is an Intra-BSS frame or an Inter-BSS frame based on the type of MAC frame and the MAC Address field. This will be described in more detail with reference to FIG. 16.

Figure 16:
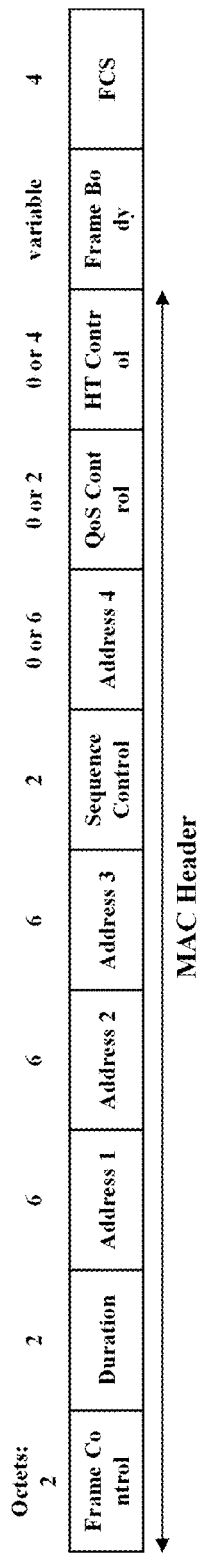
FIG. 16 shows a method for determining whether a received frame is an Intra-BSS frame or an Inter-BSS frame according to a type of a frame and a value of a MAC header field of a wireless communication terminal according to an embodiment of the present invention.

FIG. 16 shows a method for determining whether a received frame is an Intra-BSS frame or an Inter-BSS frame according to a type of a frame and a value of a MAC header field of a wireless communication terminal according to an embodiment of the present invention.

The wireless communication terminal may determine whether the frame is a data frame according to the Type field value of the Frame Control field of the MAC header. In the case of a data frame, the information indicated by the Address field differs depending on the To DS field and the From DS field. Accordingly, when the Type field of the Frame Control field of the MAC header indicates a data frame, the wireless communication terminal may determine whether the received frame is an Intra-BSS frame or an Inter-BSS frame based on the value of the To DS field, the From DS field and the Address field.

Specifically, if the frame received by the wireless communication terminal is a data frame and the values of the To DS field and the From DS field are both 0, the Address 3 field indicates a BSSID. Therefore, when the frame received by the wireless communication terminal is a data frame and the values of the To DS field and the From DS field are both 0, if the value of the Address 3 field is the BSSID of the BSS including the wireless communication terminal, the wireless communication terminal may determine the received frame as an Intra-BSS frame. In addition, when the frame received by the wireless communication terminal is a data frame and the values of the To DS field and the From DS field are both 0, if the value of the Address 3 field is not the BSSID of the BSS including the wireless communication terminal, the wireless communication terminal may determine the received frame as an Inter-BSS frame.

In addition, if the frame received by the wireless communication terminal is a data frame, the To DS field value is 0, and the From DS field value is 1, the Address 2 field indicates a BSSID. Therefore, when the frame received by the wireless communication terminal is a data frame and the To DS field value is 0 and the From DS field value is 1, if the value of the Address 2 field is the BSSID of the BSS including the wireless communication terminal, the wireless communication terminal may determine the received frame as an Intra-BSS frame. In addition, when the frame received by the wireless communication terminal is a data frame and the To DS field value is 0 and the From DS field value is 1, if the value of the Address 2 field is not the BSSID of the BSS including the wireless communication terminal, the wireless communication terminal may determine the received frame as an Inter-BSS frame. Also, if the To DS field value is 0, the From DS field value is 1, and the MSDU included in the MPDU is a basic A-MSDU, the Address 3 field indicates a BSSID. Therefore, when the frame received by the wireless communication terminal is a data frame and the To DS field value is 0 and the From DS field value is 1 and the MSDU included in the MPDU is a basic A-MSDU, if the value of the Address 3 field is the BSSID of the BSS including the wireless communication terminal, the wireless communication terminal may determine the received frame as an Intra-BSS frame. In addition, when the frame received by the wireless communication terminal is a data frame and the To DS field value is 0 and the From DS field value is 1 and the MSDU included in the MPDU is a basic A-MSDU, if the value of the Address 3 field is not the BSSID of the BSS including the wireless communication terminal, the wireless communication terminal may determine the received frame as an Inter-BSS frame.

In addition, if the frame received by the wireless communication terminal is a data frame, the To DS field value is 1, and the From DS field value is 0, the Address 1 field indicates a BSSID. Therefore, when the frame received by the wireless communication terminal is a data frame and the To DS field value is 1 and the From DS field value is 0, if the value of the Address 1 field is the BSSID of the BSS including the wireless communication terminal, the wireless communication terminal may determine the received frame as an Intra-BSS frame. In addition, when the frame received by the wireless communication terminal is a data frame and the To DS field value is 1 and the From DS field value is 0, if the value of the Address 1 field is not the BSSID of the BSS including the wireless communication terminal, the wireless communication terminal may determine the received frame as an Inter-BSS frame. Also, if the To DS field value is 1, the From DS field value is 1, and the MSDU included in the MPDU is a basic A-MSDU, the Address 3 field indicates a BSSID. Therefore, when the frame received by the wireless communication terminal is a data frame and the To DS field value is 1 and the From DS field value is 0 and the MSDU included in the MPDU is a basic A-MSDU, if the value of the Address 3 field is the BSSID of the BSS including the wireless communication terminal, the wireless communication terminal may determine the received frame as an Intra-BSS frame. In addition, when the frame received by the wireless communication terminal is a data frame and the To DS field value is 1 and the From DS field value is 0 and the MSDU included in the MPDU is a basic A-MSDU, if the value of the Address 3 field is not the BSSID of the BSS including the wireless communication terminal, the wireless communication terminal may determine the received frame as an Inter-BSS frame. In addition, specifically, when the frame received by the wireless communication terminal is a data frame, the To DS field value is 1, the From DS field is 1, and the MSDU included in the frame is a BASIC A-MSDU, the Address 3 and Address 4 fields indicate the BSSID. When the frame received by the wireless communication terminal is a data frame, the To DS field value is 1, the From DS field is 1, and the MSDU included in the frame is a BASIC A-MSDU, if the value of the Address 3 field or the value of the Address 4 field is the BSSID of the BSS including the wireless communication terminal, the wireless communication terminal may determine the received frame as an Intra-BSS frame. In addition, when the frame received by the wireless communication terminal is a data frame, the To DS field value is 1, the From DS field is 1, and the MSDU included in the frame is a BASIC A-MSDU, if both the value of the Address 3 field and the value of the Address 4 field are not the BSSID of the BSS including the wireless communication terminal, the wireless communication terminal may determine the received frame as an Inter-BSS frame.

When the received frame is a management frame, the Address 1 field is an RA field and the Address 2 field is a TA field. Also, if the received frame is a management frame, the Address 3 field may be a BSSID field. Therefore, when the frame received by the wireless communication terminal is a management frame, if the value of one of the Address 1 field, the Address 2 field, and the Address 3 field is the BSSID of the BSS including the wireless communication terminal, the wireless communication terminal may determine the received frame as an Intra-BSS frame. In addition, when the frame received by the wireless communication terminal is a management frame, if all the values of the Address 1 field, the Address 2 field, and the Address 3 field are not the BSSID of the BSS including the wireless communication terminal, the wireless communication terminal may determine the received frame as an Intra-BSS frame.

In addition, when the BSS including the wireless communication terminal has the BSSID included in the multiple BSSID set, when the wireless communication terminal determines that the received frame is an Intra-BSS frame or an Inter-BSS frame, the wireless communication terminal may regard the BSSID included in the corresponding multiple BSSID set as a BSSID of the BSS including the wireless communication terminal. Specifically, a case where the value of the address field described above is the BSSID of the BSS including the wireless communication terminal includes one of a case where the BSS including the wireless communication terminal has the BSSID included in the multiple BSSID set and a case where the value of the Address field is any one of a plurality of BSSIDs included in the multiple BSSID set.

Also, a case where the value of the Address field is the BSSID of the BSS including the wireless communication terminal may include a case where if the Individual/Group bit is set to 0 in the value of the Address field, the BSSID of the BSS including the wireless communication terminal is the same. Also, a case where the value of the Address field is the BSSID of the BSS including the wireless communication terminal may include a case where the value of the Address field is a frequency band signaling variant of the BSSID of the BSS including the wireless communication terminal.

Also, when the FCS field value of the MPDU is valid, the wireless communication terminal may determine whether the received frame is an Intra-BSS frame or an Inter-BSS frame based on the MAC header or the MAC address field of the MAC header.

Figure 17:
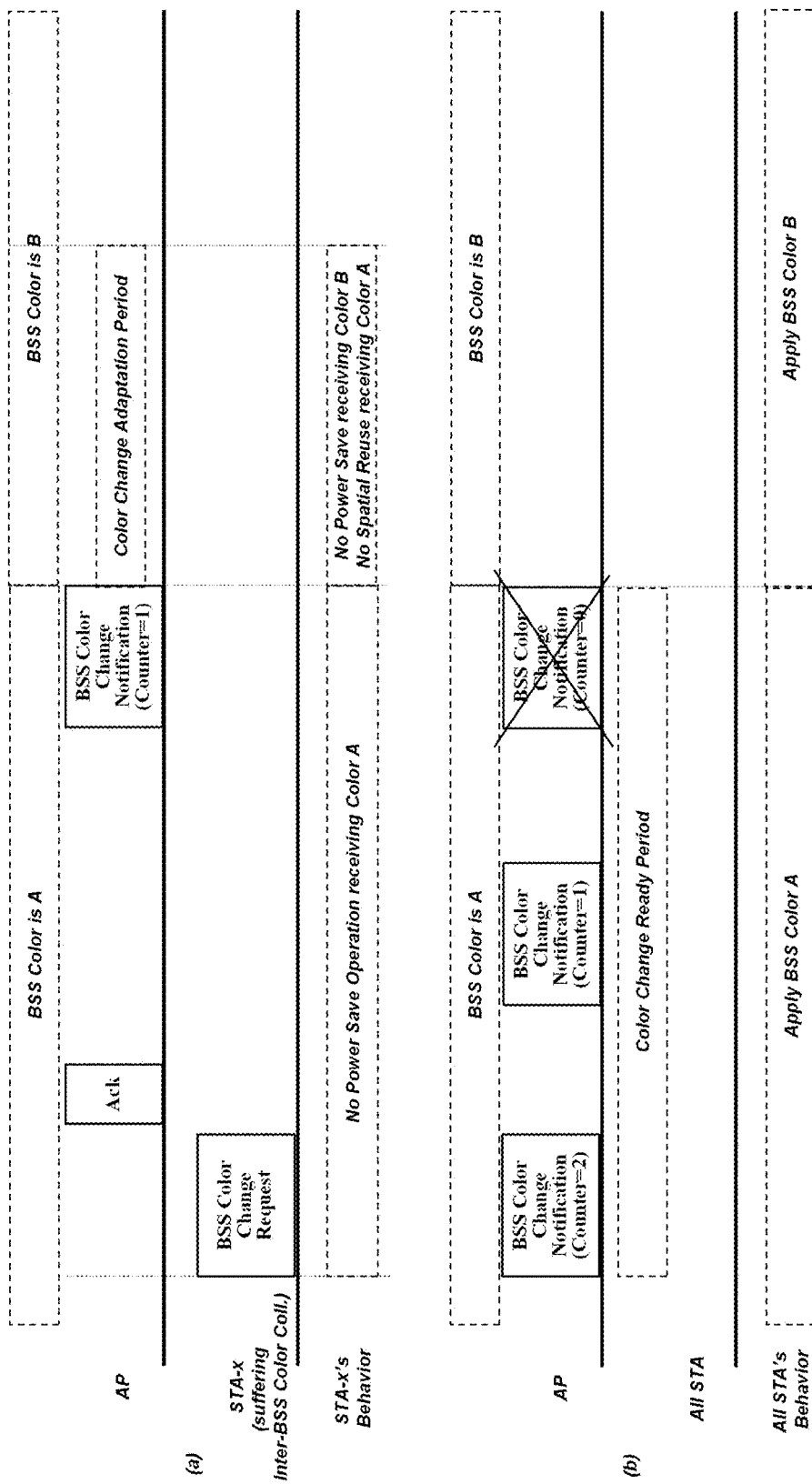
FIG. 17 shows the operation of the wireless communication terminal for correcting the Inter-BSS color collision situation and the operation of the wireless communication terminal to prevent the Intra-BSS color confusion when the wireless communication terminal according to the embodiment of the present invention detects an inter-BSS color collision.

FIG. 17 shows the operation of the wireless communication terminal for correcting the Inter-BSS color collision situation and the operation of the wireless communication terminal to prevent the Intra-BSS color confusion when the wireless communication terminal according to the embodiment of the present invention detects an inter-BSS color collision.

When a wireless communication terminal other than an access point detects an inter-BSS color collision, the wireless communication terminal may transmit a frame requesting the BSS color change to the access point.

Also, when the access point changes the BSS color, the access point may transmit a frame indicating a BSS color change. At this time, the wireless communication terminal receiving the frame indicating the BSS color change may not perform the SR operation based on the BSS color indicated by the signaling field of the PPDU for a predetermined time. In addition, the wireless communication terminal receiving the frame indicating the BSS color change may not perform the power save operation based on the BSS color indicated by the signaling field of the PPDU for a predetermined time. At this time, the frame indicating the BSS color change may include information indicating a predetermined time. In a specific embodiment, when a wireless communication terminal having a BSS color of 1 receives a frame indicating that the BSS color is changed to 2, the wireless communication terminal may operate as follows. The wireless communication terminal may not perform the SR operation for the PPDU indicating the BSS color 2 for a predetermined time from the time point when the frame indicating the BSS color change is received. In addition, the wireless communication terminal may not perform the power save operation for the PPDU indicating the BSS color 2 for a predetermined time from the time point when the frame indicating the BSS color change is received.

In addition, the frame indicating the BSS color change may include a counter indicating the BSS color change history. Specifically, the value of the counter may be toggled between 0 and 1. In yet another specific embodiment, the value of the counter may increase in a wrap around form within a predetermined size range. When the counter value is changed, the wireless communication terminal receiving the frame indicating the BSS color change may determine that the BSS color is changed.

In another specific embodiment, the frame indicating the change in BSS color may include a counter indicating when the BSS color is applied. Specifically, the access point may periodically transmit a frame indicating a change in the BSS color for a predetermined period of time. In this case, the wireless communication terminal may reduce the counter value every time the frame indicating the change of the BSS color is transmitted. The wireless communication terminal receiving the frame indicating the change of the BSS color may apply the changed BSS color when the counter value reaches 0.

The wireless communication terminal may prevent Intra-BSS color confusion through these operations. A specific embodiment to which such an operation is applied will be described with reference to FIGS. 17(a) and 17(b).

The embodiment of FIG. 17(a) is a case where a station detects Inter-BSS color collision. At this time, the station transmits a frame requesting the BSS color change to the access point. The access point receives the frame requesting the BSS color change and transmits an ACK frame for the frame requesting the BSS color change to the station. The access point changes the BSS color and transmits a frame indicating the BSS color change. At this time, the counter value of the frame indicating the BSS color change is 1. The counter value indicates the change history of the BSS color. In addition, the wireless communication terminal receiving the frame indicating the BSS color change does not perform the SR operation and the power save operation for a predetermined time from when the frame indicating the BSS color change is received.

The embodiment of FIG. 17(b) is a case where the access point detects Inter-BSS color collision. At this time, the access point transmits a frame indicating BSS color change. Specifically, the access point periodically transmits a frame indicating a BSS color change for a predetermined period of time. At this time, the access point indicates the BSS color application time by decreasing the counter value included in the frame indicating the BSS color change. When the wireless communication terminal receives a frame indicating a BSS color change whose counter value is 0, it applies the changed BSS color.

Figure 18:
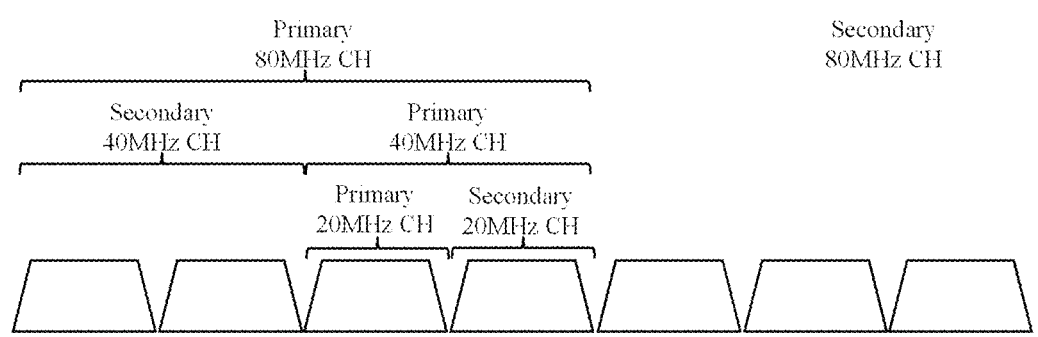
FIG. 18 shows a method of bonding a frequency band for a broadband communication according to an embodiment of the present invention.

FIG. 18 shows a method of bonding a frequency band for a broadband communication according to an embodiment of the present invention.

Unless the sub-frequency band is used in the OFDMA transmission, the wireless communication terminal may use a frequency band having a frequency bandwidth of 20 MHz, 40 MHz, 80 MHz, and 160 MHz. Specifically, the wireless communication terminal may bond and use a primary channel having a frequency bandwidth of 20 MHz and a secondary channel adjacent to the primary channel and having a bandwidth of 20 MHz. At this time, the primary channel is designated for each access point. Also, the bonded frequency band may be referred to as the primary 40 MHz channel. In addition, the wireless communication terminal may bond and use a primary 40 MHz channel and a secondary channel having a 40 MHz bandwidth and adjacent to the primary 40 MHz channel. At this time, the bonded frequency band may be referred to as the primary 80 MHz channel. In addition, the wireless communication terminal may bond and use a primary 80 MHz channel and a secondary channel having an 80 MHz bandwidth and adjacent to the primary 80 MHz channel. In addition, the wireless communication terminal may bond and use a primary 80 MHz channel and a secondary channel having an 80 MHz bandwidth and not adjacent to the primary 80 MHz channel. For convenience of description, a frequency band having a frequency bandwidth or 20 MHz or more is referred to herein as a broadband. When the wireless communication terminal performs the broadband communication, the bandwidth of the frequency band required for the CCA also increases. Therefore, when a wireless communication terminal accesses a channel through a contention procedure, an efficient CCA method for broadband is needed. A method of the wireless communication terminal to perform the CCA for the broadband will be described with reference to FIGS. 19 and 20.

Figure 19:
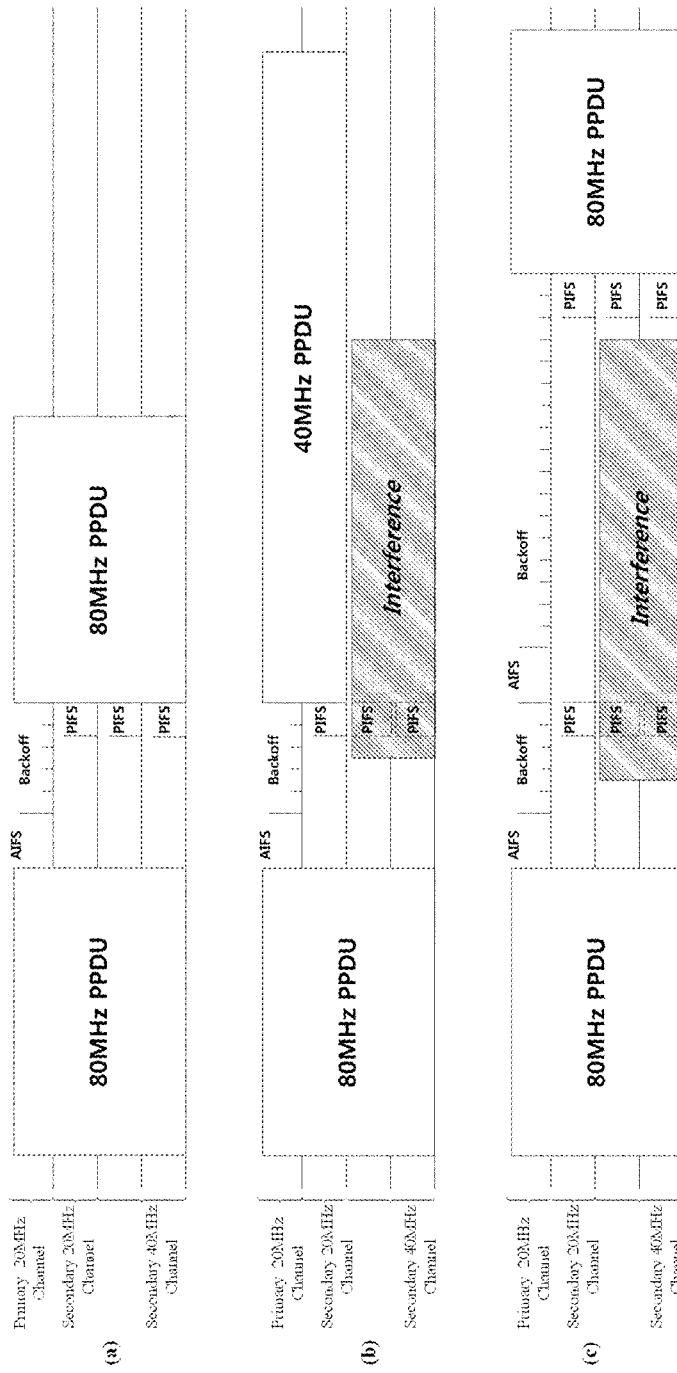
FIG. 19 shows a method of transmitting a broadband PPDU by a wireless communication terminal according to an embodiment of the present invention.

FIG. 19 shows a method of transmitting a broadband PPDU by a wireless communication terminal according to an embodiment of the present invention.

The wireless communication terminal may perform a contention procedure for a primary channel having a channel-unit frequency bandwidth. At this time, the wireless communication terminal may transmit a PPDU by bonding a sub-channel which is idle for a preceding predetermined time from a transmission time determined by a contention procedure in a primary channel. Specifically, the secondary channel may be a frequency band adjacent to the primary channel. Also, the predetermined time may be PIFS. In addition, the channel-unit frequency bandwidth represents the minimum frequency bandwidth that the wireless communication terminal may use when the wireless communication terminal does not use the sub-frequency band in the OFDMA transmission. The channel-unit frequency bandwidth may be 20 MHz as described above.

The specific operation of the wireless communication terminal in the contention procedure may be the same as the embodiment described with reference to FIG. 6. Specifically, when the channel is idle more than a predetermined time interval, the wireless communication terminal may perform a contention procedure according to a backoff window. At this time, the predetermined time interval may be any one of IFS defined in 802.11. For example, the predetermined time interval may be either AIFS or PIFS. Specifically, the wireless communication terminal may acquire any value in the contention window as a backoff counter. If the idle time of the corresponding channel continues for a slot time or longer, the wireless communication terminal decreases the value of the backoff counter. At this time, the slot time may be 9 us. The wireless communication terminal waits until the backoff counter value reaches 0. When the value of the backoff counter reaches 0, the wireless communication terminal accesses the corresponding channel.

Also, the channel may become busy before the value of the backoff counter reaches 0. In this case, when the channel becomes idle again and is idle over a predetermined time interval, the wireless communication terminal may perform the contention procedure again according to the backoff window. At this time, the wireless communication terminal may perform the backoff procedure based on the remaining backoff counter value in the previous contention procedure.

In the embodiment of FIG. 19(*a*), the wireless communication terminal performs a contention procedure on a primary 20 MHz channel. During the preceding PIFS from when the value of the backoff counter reaches 0, both the secondary 20 MHz channel and the secondary 40 MHz channel maintain an idle state. Accordingly, the wireless communication terminal transmits the PPDU at the time point when the value of the backoff counter becomes 0 through the frequency band having the bandwidth of 80 MHz.

In the embodiment of FIG. 19(*b*), the wireless communication terminal performs a contention procedure on a primary 20 MHz channel. During the preceding PIFS from when the value of the backoff counter becomes 0, the secondary 20 MHz channel maintains an idle state. During the preceding PIFS from when the value of the backoff counter becomes 0, the secondary 40 MHz channel does not maintain an idle state. Therefore, the wireless communication terminal transmits the PPDU through a frequency band having a bandwidth of 40 MHz. In the embodiments of FIGS. 19(*a*) and 19(*b*), the wireless communication terminal must be able to dynamically allocate the PPDU according to the bandwidth of the usable frequency band. A case where it is difficult to dynamically allocate the PPDU according to the bandwidth of the usable frequency band of the wireless communication terminal will be described with reference to FIG. 19(*c*).

When the wireless communication terminal is unable to transmit in the frequency band corresponding to the frequency bandwidth selected at the time of preparation for transmission, even if the primary channel is idle for a time greater than the backoff window indicated by the backoff counter value, the wireless communication terminal may wait without transmission. At this time, the wireless communication terminal may wait until the wireless communication terminal is able to transmit the PPDU in the frequency band corresponding to the frequency bandwidth selected at the time of preparation for transmission.

In the embodiment of FIG. 19(*c*), the wireless communication terminal performs a contention procedure on a primary 20 MHz channel. During the preceding PIFS from when the value of the backoff counter becomes 0, the secondary 20 MHz channel is idle, but the secondary 40 MHz channel does not maintain an idle state. Therefore, the wireless communication terminal waits until transmission is possible in the frequency band having the 80 MHz bandwidth.

Figure 20:
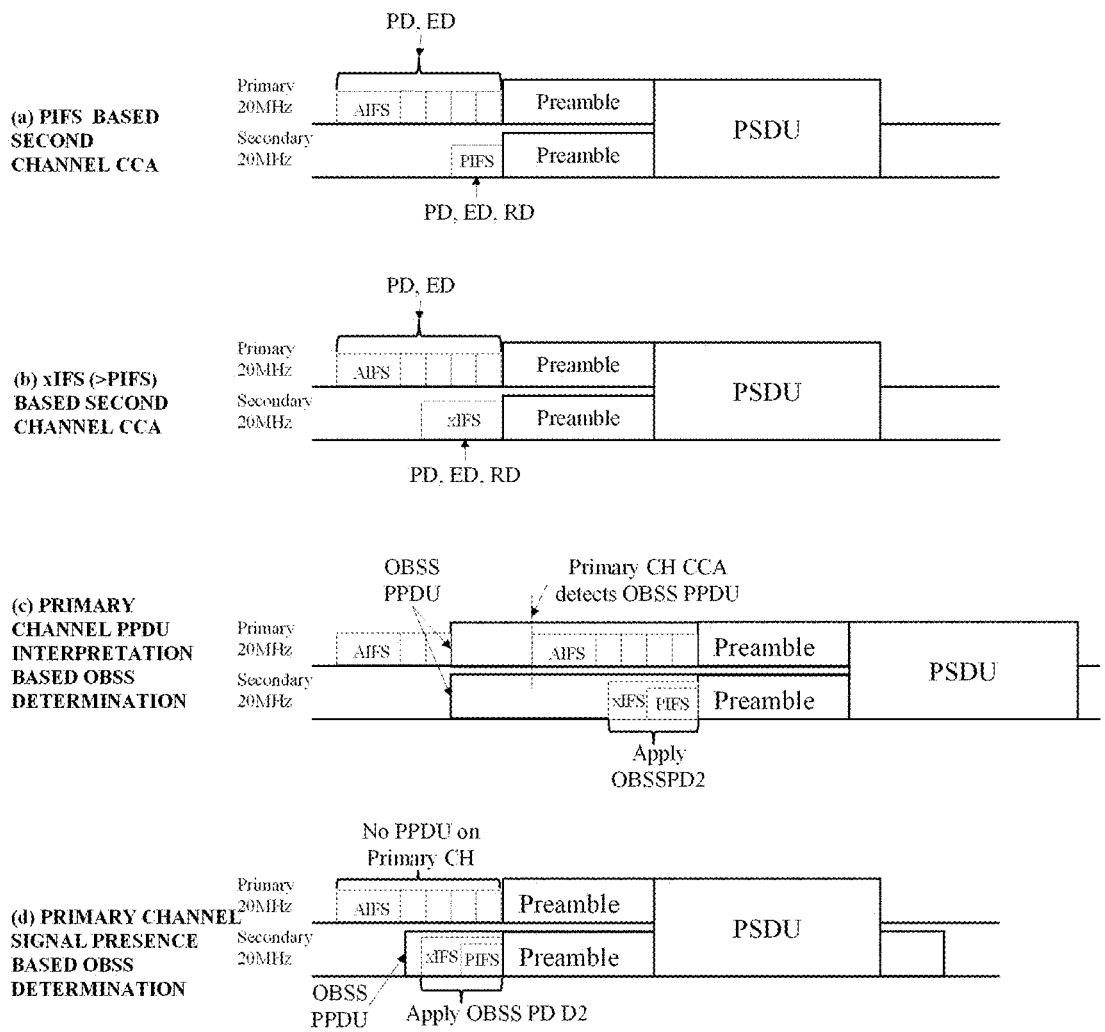
FIG. 20 shows that a wireless communication terminal according to an embodiment of the present invention transmits a PPDU through a frequency band having a frequency bandwidth of 40 MHz.

FIG. 20 shows that a wireless communication terminal according to an embodiment of the present invention transmits a PPDU through a frequency band having a frequency bandwidth of 40 MHz.

As described above, the wireless communication terminal performs the CCA operation to determine whether the corresponding channel is idle before starting the backoff procedure. Also, the wireless communication terminal performs the CCA operation to determine whether the corresponding channel is idle during the slot time in the backoff procedure. At this time, the wireless communication terminal may perform the CCA operation based on at least one of preamble detection (PD) and energy detection (ED). Also, the wireless communication terminal may perform the CCA operation based on Repetition Detection (RD).

The PD is a method in which the wireless communication terminal detects repetitive signal patterns transmitted in the L-STF corresponding to the first part of the PPDU and detects the strength of a signal used for PPDU transmission. The Energy Detection (ED) is a method in which a wireless communication terminal senses the energy intensity of an arbitrary wireless signal. In addition, the RD is a method in which a wireless communication terminal detects a repeated pattern in a signal used for PPDU transmission and detects the strength of a signal used for PPDU transmission. The threshold used when the wireless communication terminal performs the CCA based on the PD in the primary channel is referred to as a first PD CCA threshold. Also, the threshold used when the wireless communication terminal performs the CCA based on the ED in the primary channel is referred to as a first ED CCA threshold. Also, a threshold used when the wireless communication terminal performs the CCA based on the RD in the primary channel is referred to as a first RD CCA threshold. The first RD CCA threshold may be the same as the first PD CCA threshold. When the PPDU received by the wireless communication terminal is transmitted from the OBSS, the wireless communication terminal may perform the CCA operation by applying the OBSS first PD CCA threshold to the PPDUs transmitted through the OBSS. In this case, the OBSS first PD CCA threshold refers to a threshold for performing the CCA based on the PD in the primary channel. The wireless communication terminal may determine whether the received PPDU is a PPDU transmitted from the OBSS based on at least one of the BSS color indicated by the signaling field of the PPDU and the Address field of the MAC header. Specifically, the wireless communication terminal may determine whether the received PPDU is a PPDU transmitted from the OBSS according to the embodiment described with reference to FIGS. 6 to 16.

In a specific embodiment, the OBSS first PD CCA threshold may be equal to or greater than the first PD CCA threshold and may be less than or equal to the first ED CCA threshold. In addition, the wireless communication terminal may adjust the value of the OBSS first PD based on the transmission power TXPWR to be used when the wireless communication terminal transmits the PPDU. For example, the wireless communication terminal may adjust the value of the first PD of the OBSS based on the transmission power TXPWR to be used when the wireless communication terminal transmits the PPDU within the range of the first PD (−82 dBm)<=OBSS first PD<=first ED (−62 dBm).

As described above, when transmitting a PPDU, the wireless communication terminal performs the OFDM transmission for a field for a legacy wireless communication terminal and a non-legacy signaling field based on 64 FFT. Specifically, fields for legacy wireless communication terminals may be L-STF, L-LTF, and L-SIG fields. In addition, the non-legacy signaling field may also be an RL-SIG field, an HE-SIG-A field, and an HE-SIG-B field. When the wireless communication terminal OFDM-transmits the PPDU based on 64 FFT, in relation to the signal for transmitting the PPDU, the data having a duration of 3.2 us and the cyclic prefix (CP) having a duration of 0.4 us or 0.8 us are repeated. Accordingly, the wireless communication terminal may receive about 6 to 7 symbols through the CCA during PIFS (25 us), and measure the strength of the signal.

The wireless communication terminal performs the OFDM transmission for the data included in the PPDU and a part of the preamble based on 256 FFT. When the wireless communication terminal performs the OFDM transmission for the PPDU based on 256 FFT, in relation to the signal for transmitting the PPDU, the data having a duration of 12.8 us and the cyclic prefix (CP) having a duration of any one of 0.8 us, 1.6 us, and 3.2 us are repeated. Therefore, the wireless communication terminal may receive up to one to two symbols through the CCA for PIFS (25 us) and measure the strength of the signal. Therefore, when the wireless communication terminal receives a signal for performing the OFDM transmission of the PPDU using 64 FFT and 256 FFT together, it may be difficult for the wireless communication terminal to determine whether the signal received during the PIFS is a signal for transmitting the PPDU. Accordingly, when the wireless communication terminal fails to determine whether the signal received by the wireless communication terminal is a signal for transmitting the PPDU, the wireless communication terminal may perform the CCA based on the ED. In addition, when the wireless communication terminal receives a signal for performing the OFDM transmission of the PPDU using 64 FFT and 256 FFT together, the wireless communication terminal may determine whether the received signal is a signal for transmitting the PPDU based on the RD as well as the PD.

In the embodiment of FIG. 20(a), the wireless communication terminal performs a contention procedure based on a backoff counter in the primary channel. At this time, the wireless communication terminal performs the CCA based on the PD and the ED. Also, as the wireless communication terminal performs the CCA based on PD, ED, and RD in a secondary channel, it is determined whether the back-off counter maintains the idle state for the preceding PIFS from the time when the counter value becomes 0.

In addition, when the wireless communication terminal is idle for a predetermined time from the transmission time determined through the contention procedure of the primary channel in the secondary channel, the wireless communication terminal may transmit the PPDU by bonding the primary channel and the secondary channel, and the predetermined time may be longer than the PIFS. As described above, when the PPDU is transmitted by the OFDM transmission based on the 256 FFT, it may be difficult for the wireless communication terminal to determine whether the wireless signal is the PPDU during the PIFS. At this time, the predetermined time may be less than or equal to AIFS. When the wireless communication terminal acquires 0 as the backoff counter in the contention procedure for the primary channel, the wireless communication terminal determines whether the primary channel is idle during the AIFS time. Therefore, when the wireless communication terminal determines that the secondary channel is idle for a time interval larger than AIFS, the idle time interval required to transmit the PPDU in the secondary channel may be greater than the idle time interval required to transmit the PPDU in the primary channel.

In another specific embodiment, the predetermined time may be equal to or less than the sum of the time represented by the AIFS and the time represented by the backoff counter. Accordingly, the wireless communication terminal may increase the detection accuracy of the PPDU transmitted through the secondary channel. However, the detection accuracy of the PPDU transmitted through the secondary channel may vary depending on the backoff counter value. In the embodiment of FIG. 20(b), the wireless communication terminal performs a contention procedure in the primary channel as described in the embodiment of FIG. 20(a). The wireless communication terminal determines whether the secondary channel maintains an idle state for the preceding xIFS time from the time when the backoff counter is 0 in the contention procedure of the primary channel. At this time, xIFS may indicate a frame interval larger than PIFS.

In another specific embodiment, when the wireless communication terminal determines whether the secondary channel is idle for a predetermined time from the transmission time determined through the contention procedure in the primary channel, the wireless communication terminal may adjust the length of a predetermined time according to the modulation method of the received signal. At this time, the modulation method may be either OFDM transmission using 64 FFT or OFDM transmission using 256 FFT. Specifically, if the received signal is transmitted by the OFDM transmission based on 64 FFT in the secondary channel, the wireless communication terminal may determine whether the secondary channel is idle during the preceding first time interval from the transmission time determined through the contention procedure in the primary channel. In addition, if the received signal is OFDM-transmitted based on 256 FFT in the secondary channel, the wireless communication terminal may determine whether the secondary channel is idle during the preceding second time interval from the transmission time determined through the contention procedure in the primary channel. At this time, the first time interval may be shorter than the second time interval. In a specific embodiment, the first time interval is PIFS and the second time interval is greater than the time indicated by the PIFS and may be less than the sum of the time indicated by the AIFS and the time indicated by the backoff counter.

If the sum of the time indicated by the AIFS and the time indicated by the backoff counter obtained in the contention procedure of the primary channel is greater than the minimum time for detecting the OFDM transmitted signal based on 256 FFT and a wireless communication terminal receives a signal to be transmitted by the OFDM transmission based on 256 FFT in a secondary channel, the time that the wireless communication terminal determines whether the secondary channel remains idle may be xIFS indicating a time greater than the PIFS. If the sum of the time indicated by the AIFS and the time indicated by the backoff counter obtained in the contention procedure of the primary channel is greater than the minimum time for detecting the signal transmitted by the OFDM transmission based on 256 FFT and a wireless communication terminal receives a signal to be transmitted by the OFDM transmission based on 64 FFT in a secondary channel, the time for determining whether the secondary channel remains idle may be PIFS or xIFS.

If the sum of the time indicated by the AIFS and the time indicated by the backoff counter obtained in the contention procedure of the primary channel is less than the minimum time for detecting the signal transmitted by the OFDM transmission based on 256 FFT, it may be determined whether the secondary channel is idle during the PIFS from the transmission time determined through the contention procedure in the primary channel. At this time, when the wireless communication terminal senses a signal transmitted by the OFDM transmission based on 256 FFT in the secondary channel, the wireless communication terminal may determine whether the secondary channel is idle during the PIFS based on the ED. In addition, when the wireless communication terminal senses a signal OFDM-transmitted based on 64 FFT in the secondary channel, the wireless communication terminal may determine whether the secondary channel is idle during the PIFS based on at least one of PD, RD, and ED. This is because the probability of detecting an OFDM symbol is high when a wireless communication terminal attempts to detect an OFDM symbol transmitted based on 256 FFT in a secondary channel for a relatively short period of time.

In the embodiment of FIG. 20(c) and the embodiment of FIG. 20(d), when the signal received by the wireless communication terminal performs OFDM transmission based on 64 FFT, the wireless communication terminal determines whether the secondary channel is idle during the preceding PIFS from the time point when the transmission is determined in the contention procedure of the primary channel. In addition, when the signal received by the wireless communication terminal is transmitted by the transmitted by the OFDM transmission based on 256 FFT, the wireless communication terminal determines whether the secondary channel is idle during the preceding xIFS from the time point when the transmission is determined in the contention procedure of the primary channel. At this time, xIFS indicates a time larger than PIFS.

The wireless communication terminal may apply different PD CCA thresholds depending on whether the signal received in the secondary channel is transmitted by the OFDM transmission based on 64 FFT or transmitted by the OFDM transmission based on 256 FFT. For convenience of description, a threshold used when the wireless communication terminal performs the CCA based on the PD in the secondary channel is referred to as a second PD CCA threshold. Specifically, the wireless communication terminal may apply the second PD CCA threshold, which is larger than the wireless signal transmitted by the OFDM transmission based on the 64 FFT, on the wireless signal transmitted by the OFDM transmission based on the 256 FFT. Even if the signal received on the secondary channel is an OBSS PPDU, the wireless communication terminal may apply different PD CCA thresholds according to whether the received OBSS PPDU is transmitted by the OFDM transmission based on 64 FFT or whether the received OBSS PPDU is transmitted by the OFDM transmission based on 256 FFT. At this time, the threshold applied to the CCA operation based on the PD for the OBSS PPDU transmitted from the secondary channel is referred to as the OBSS second PD CCA threshold. Also, the threshold applied when the OBSS PPDU in the secondary channel is transmitted by the OFDM transmission based on the 64 FFT is referred to as the OBSS second legacy PD CCA threshold, and the threshold applied when the OBSS PPDU in the secondary channel is transmitted by the OFDM transmission based on 256 FFT is referred to as OBSS second non-legacy PD CCA threshold. Also, the CCA operation based on the ED in the secondary channel is referred to as a second ED CCA threshold. Specifically, the OBSS second PD CCA threshold may be equal to or greater than the second PD CCA threshold, and may be less than or equal to the second ED CCA threshold. In addition, the wireless communication terminal may adjust the OBSS second PD CCA threshold based on the transmission power TXPWR to be used when the wireless communication terminal transmits the PPDU. In addition, the second RD CCA threshold, which is a threshold used when the wireless communication terminal performs the CCA based on RD in the secondary channel, may be equal to the second PD CCA threshold. For this operation, the wireless communication terminal needs to determine whether an OBSS PPDU is received in the secondary channel.

The wireless communication terminal may determine whether the signal received in the secondary channel is an OBSS PPDU based on the determination of the signal received in the primary channel Specifically, when receiving a PPDU from a primary channel, the wireless communication terminal may apply a determination on a PPDU received from a primary channel Specifically, when the PPDU received by the wireless communication terminal on the primary channel is a PPDU transmitted from the OBSS, the wireless communication terminal may perform the CCA operation by applying the OBSS first PD CCA threshold to the primary channel and perform the CCA operation by applying the OBSS second PD CCA threshold to the secondary channel. At this time, the OBBS first PD CCA threshold and the OBSS second PD CCA threshold may be the same. In the embodiment of FIG. 20(c), the wireless communication terminal determines that the PPDU received in the primary channel is the PPDU transmitted in the OBSS. Accordingly, the wireless communication terminal performs the CCA operation by applying the OBSS first PD CCA threshold in the primary channel. Also, the wireless communication terminal performs the CCA operation by applying the OBSS second PD CCA threshold in the secondary channel.

In addition, when the PPDU is not detected in the primary channel, the wireless communication terminal may determine that the PPDU detected in the secondary channel is the PPDU transmitted in the OBSS. This is because that the wireless communication terminal included in the same BSS extends the frequency band, including the primary channel as described with reference to FIG. 18. In the embodiment of FIG. 20(d), the wireless communication terminal does not detect PPDU reception in the primary channel. Accordingly, the wireless communication terminal determines that the PPDU received in the secondary channel is an OBSS PPDU. The wireless communication terminal performs the CCA operation by applying the OBSS second PD CCA threshold in the secondary channel.

In addition, the OBSS second PD CCA threshold may be equal to or greater than the second PD CCA threshold, and may be less than or equal to the second ED CCA threshold. The wireless communication terminal may adjust the OBSS second PD CCA threshold based on the transmission power TXPWR of the PPDU to be transmitted by the wireless communication terminal.

Specifically, the wireless communication terminal may adjust the OBSS second legacy PD CCA threshold based on the transmission power TXPWR of the PPDU to be transmitted by the wireless communication terminal within a range of second legacy PD CCA threshold (−72 dBm) <=OBSS second legacy PD CCA threshold<=second ED CCA (−62 dBm) threshold. When a 64 FFT OFDM-based symbol is detected, it is unclear whether the PPDU included in the symbol is a legacy PPDU or a non-legacy PPDU. Therefore, in order to maintain equity with legacy wireless communication terminals, the wireless communication terminal uses a value greater than −72 dBm, which is the CCA threshold applied when the legacy wireless communication terminal performs the secondary channel CCA, as the OBSS second legacy PD CCA threshold.

In another specific embodiment, when the wireless communication terminal senses an OFDM transmitted signal based on 256 FFT in the secondary channel, the wireless communication terminal may adjust the OBSS second non-legacy PD CCA threshold based on the transmission power TXPWR of the PPDU to be transmitted by the wireless communication terminal within a range of second non-legacy PD CCA threshold (−82 dBm)<=OBSS second non-legacy PD CCA threshold<=second ED CCA threshold (−62 dBm). If a 256 FFT OFDM based symbol is detected, since it is clear that it is a non-legacy PPDU, so that the problem of equity with a legacy wireless communication terminal may not be considered.

Also, the wireless communication terminal may adjust the OBSS second legacy PD CCA threshold and the OBSS second non-legacy PD CCA threshold based on the OBSS first PD CCA threshold. Specifically, the wireless communication terminal may apply the OBSS first PD CCA threshold to the OBSS second legacy PD CCA threshold and the OBSS second non-legacy PD CCA threshold. In addition, when the first PD CCA threshold of the OBSS is greater than the second legacy PD CCA threshold of the OBSS, the wireless communication terminal may apply the OBSS first PD CCA threshold to the OBSS second legacy PD CCA threshold. In this case, when the OBSS first PD CCA threshold is equal to or smaller than the OBSS second legacy PD CCA threshold, the OBSS first PD CCA threshold may not be applied to the OBSS second legacy PD CCA threshold.

Figure 21:
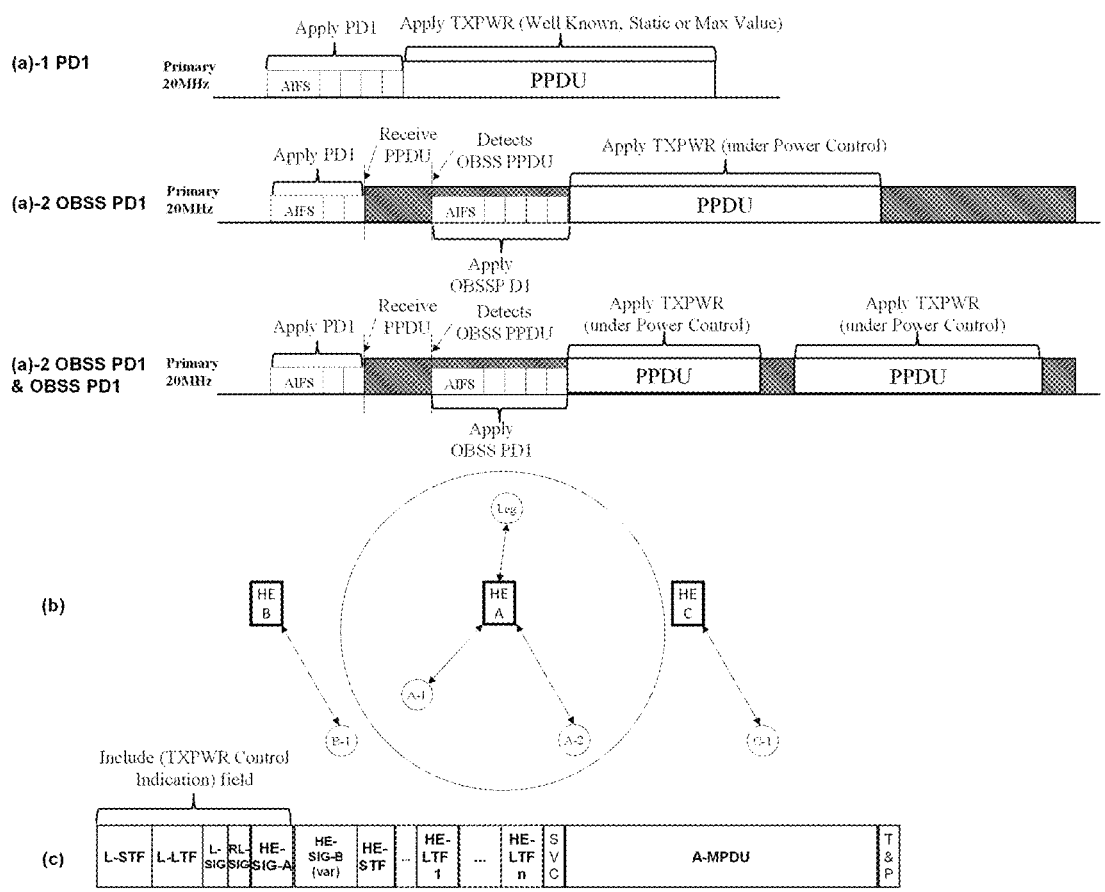
FIG. 21 shows that a wireless communication terminal according to an embodiment of the present invention adjusts transmission power in an SR operation.

FIG. 21 shows that a wireless communication terminal according to an embodiment of the present invention adjusts transmission power in an SR operation.

The wireless communication terminal may set the OBSS PD CCA threshold based on the transmission power of the PPDU to be transmitted as described above. Specifically, if the transmission power of the PPDU to be transmitted is low, the wireless communication terminal may increase the OBSS PD CCA threshold. Also, if the transmission power of the PPDU to be transmitted is low, the wireless communication terminal may reduce the OBSS PD CCA threshold. This is because when the wireless communication terminal transmits the PPDU with low transmission power, the influence of the wireless communication terminal on the OBSS is small, and when a wireless communication terminal transmits a PPDU with high transmission power, the influence of the wireless communication terminal on the OBSS is large. When the wireless communication terminal adjusts the transmission power of the PPDU in the SR operation as well as the CCA threshold, the influence of the SR operation of the wireless communication terminal on the transmission in the OBSS may be reduced or the efficiency of the SR operation may be increased.

Therefore, the wireless communication terminal may transmit the PPDU with the unadjusted transmission power for the SR operation while the OBSS PPDU is transmitted, or transmit the PPDU with the adjusted transmission power for the SR operation. At this time, the unadjusted power for the SR operation may be a predetermined transmission power. In yet another specific embodiment, the unadjusted power for SR operation may be the maximum transmit power that the wireless communication terminal may output. In addition, the predetermined transmission power may be designated by the access point. Specifically, when the wireless communication terminal detects the reception of the OBSS PPDU and applies the OBSS PD CCA threshold, the wireless communication terminal may transmit the PPDU by adjusting the transmission power based on the OBSS PD CCA threshold. In addition, when the wireless communication terminal does not detect the reception of the OBSS PPDU, the wireless communication terminal may transmit the PPDU with the transmission power corresponding to the PD CCA threshold. Specifically, when the wireless communication terminal does not detect the reception of the OBSS PPDU, the wireless communication terminal may transmit the PPDU without adjusting the transmission power according to the PD CCA threshold. This is because the PD CCA threshold is not a relatively high CCA threshold like the OBSS PD CCA threshold.

In FIG. 21(a), (a)-1 shows a case where the wireless communication terminal does not receive the PPDU. At this time, the wireless communication terminal performs the CCA operation by applying the first PD CCA threshold PD1. In addition, the wireless communication terminal transmits PPDUs with unadjusted transmission power for the SR operation. FIG. 21(a)-2 shows a case where the wireless communication terminal receives the PPDU in the primary channel and detects that it is the PPDU transmitted in the OBSS. After the wireless communication terminal detects the PPDU transmitted from the OBSS in the primary channel, the CCA is performed by applying the OBSS first PD CCA threshold PD1. The wireless communication terminal determines that the primary channel is idle and performs a contention procedure based on the backoff. When the PPDU transmission is determined according to the contention procedure, the wireless communication terminal transmits the PPDU to the transmission power TXPWR determined based on the OBSS first PD CCA threshold PD1.

FIG. 21(b) is a network topology the non-legacy access points HE A, HE B and HE C, the non-legacy stations A-1, A-2, B-1 and C-1 and the legacy station Leg coexist. Also, FIG. 21(c) shows the PPDU format including information related to the SR operation. Through FIGS. 21(b) to 21(c), the operation of the wireless communication terminal to adjust the transmission power will be described in detail.

A wireless communication terminal other than an access point must apply a transmission power such that an access point of a BSS including a wireless communication terminal may stably receive a PPDU. For this, a wireless communication terminal other than an access point may adjust the transmission power according to the following embodiments. Specifically, a wireless communication terminal other than an access point may estimate a channel attenuation of a channel through which a PPDU is transmitted from an access point. A wireless communication terminal other than an access point may determine the transmission power of the PPDU to be transmitted based on the estimated channel attenuation. At this time, the wireless communication terminal may estimate the channel attenuation by measuring the received signal strength (RSSI) of the PPDU transmitted periodically by the access point with an explicit transmission power. Specifically, the explicit transmission power may be a known common transmission power at the BSS in which the corresponding PPDU is transmitted. The explicit transmission power may indicate the transmission power that the wireless communication terminal receiving the PPDU knows when the access point transmits the PPDU without signaling separately.

In another specific embodiment, the PPDU transmitted by the access point may include information on the transmission power at which the access point transmits the PPDU. At this time, the wireless communication terminal other than the access point may obtain the information on the transmission power of the access point transmitting the PPDU from the PPDU transmitted by the access point. A wireless communication terminal other than an access point may estimate a channel attenuation based on the information on transmission power and RSSI. Therefore, the wireless communication terminal other than the access point may adjust the transmission power of the PPDU to be transmitted based on the received signal strength of the PPDU transmitted by the access point. In addition, the wireless communication terminal other than the access point may adjust the transmission power of the PPDU to be transmitted based on the information on the received signal strength and transmission power of the PPDU transmitted by the access point.

The PPDU transmitted by the access point may include SR application information indicating whether transmission power of the PPDU is adjusted. At this time, when the SR application information indicates that the PPDU is not the PPDU of which the transmission power is adjusted, the SR application information may indicate that the PPDU is transmitted with the explicit transmission power. In addition, the wireless communication terminal other than the access point may adjust the transmission power of the PPDU to be transmitted based on the SR application information. The specific operation of the wireless communication terminal related to the SR application information will be described with reference to FIG. 21(c).

A wireless communication terminal that is the furthest from the access point in the BSS including the access point or that transmits the PPDU with the lowest RSSI is required to adjust the transmission power, so that the access point may reliably receive the PPDU transmitted by the access point. To this end, the access point may adjust the transmission power according to the following embodiments. Specifically, the access point may estimate the channel attenuation of the channel through which the PPDU is transmitted from the wireless communication terminal other than the access point. The access point may adjust the transmission power of the PPDU to be transmitted based on the estimated channel attenuation. At this time, the access point may estimate the channel attenuation by measuring the RSSI of the PPDU transmitted periodically by the wireless communication terminal other than the access point with an explicit transmission power. Specifically, the explicit transmission power may be a known common transmission power at the BSS in which the corresponding PPDU is transmitted. The explicit transmission power may indicate the transmission power that the access point receiving the PPDU knows when the wireless communication terminal other than the access point transmits the PPDU without signaling separately.

In another specific embodiment, the PPDU transmitted by the wireless communication terminal other than the access point may include information on the transmission power of the wireless communication terminal that transmits the corresponding PPDU. At this time, the access point may obtain the information on the transmission power at which the wireless communication terminal other than the access point transmits the corresponding PPDU, from the PPDU transmitted by the wireless communication terminal other than the access point. The access point may estimate the channel attenuation of the channel through which the PPDU is transmitted from the wireless communication terminal other than the access point based on the information on the transmission power and the RSSI of the PPDU transmitted by the wireless communication terminal other than the access point. Therefore, the access point may adjust the transmission power of the PPDU to be transmitted based on the information on the transmission power and the RSSI.

The PPDU transmitted by the access point may include SR application information indicating whether the PPDU is applied with transmission power adjustment. At this time, when the SR application information indicates that the PPDU is not the PPDU to which the transmission power adjustment is applied, the SR application information may indicate that the PPDU is transmitted with the explicit transmission power. In addition, the wireless communication terminal other than the access point may adjust the transmission power of the PPDU to be transmitted based on the SR application information. The specific operation of the wireless communication terminal related to the SR application information will be described with reference to FIG. 21(c).

The wireless communication terminal may measure the RSSI of a PPDU including a broadcast frame received from an access point, and transmit the RSSI of the PPDU including the broadcast frame to the access point. At this time, the broadcast frame may be a beacon frame. The access point may adjust the transmission power of the PPDU to be transmitted based on the received signal strength transmitted by the wireless communication terminal other than the access point. Specifically, the access point may adjust the transmission power of a PPDU to be transmitted based on the RSSI of a PPDU including a broadcast frame transmitted by a wireless communication terminal other than an access point.

As described above, the signaling field of the PPDU may include SR application information indicating whether the SR operation is applied. Specifically, the signaling field of the PPDU may include a TXPWR Control Indication (TCI) indicating whether the corresponding PPDU is transmitted based on the transmission power adjustment. In a specific embodiment, the TCI may be a one-bit field indicating whether the corresponding PPDU was transmitted based on transmission power adjustment or whether the corresponding PPDU was not transmitted based on transmission power adjustment.

The wireless communication terminal may perform the SR operation based on the SR application information included in the PPDU transmitted from the OBSS. Specifically, when the SR application information included in the PPDU transmitted from the OBSS indicates that the SR operation is applied, the wireless communication terminal may adjust the OBSS PD CCA threshold based on the SR application information. For example, if the SR application information included in the PPDU transmitted from the OBSS indicates that the SR operation is applied, the wireless communication terminal may adjust the OBSS PD CCA threshold based on the transmission power of the PPDU transmitted from the OBSS. In another specific embodiment, when the SR application information included in the PPDU transmitted from the OBSS indicates that the SR operation is applied, the wireless communication terminal may not transmit the PPDU while receiving the OBSS PPDU irrespective of the CCA result. When the SR operation is applied to the PPDU transmitted from the OBSS, it is transmitted after ignoring a certain degree of signal interference. Therefore, when the wireless communication terminal performs the additional SR operation, the possibility that the wireless communication terminal included in the OBSS may not receive the OBSS PPDU due to an increase in signal interference may increase.

Referring to the embodiment of FIG. 21(b), the non-legacy station A-2 may perform the SR operation while transmitting the PPDUs transmitted by the non-legacy station B-1 included in the other BSS. At this time, the non-legacy station C-1 included in the BSS different from that of the non-legacy station A-2 may receive the PPDUs transmitted by the non-legacy station A-2, and obtain the SR application information included in the PPDU. When the SR application information indicates that the SR operation is applied, the non-legacy station C-1 may adjust the OBSS PD CCA threshold based on the transmission power of the PPDU transmitted in the OBSS. In addition, the non-legacy station C-1 may not transmit the PPDU while receiving the PPDU transmitted by the non-legacy station A-2 regardless of the CCA result.

When any one wireless communication terminal transmits the PPDU through the SR operation and a wireless communication terminal receiving the PPDU transmits a PPDU in response to the corresponding PPDU, if the SR operation is not considered, the transmission of the PPDU may interfere with the transmission of the PPDU transmitted in the OBSS. In the embodiment of FIG. 21(b), the non-legacy access point HE A AP may perform the SR operation while the non-legacy station B-1 transmits the PPDU. At this time, the non-legacy access point HE A AP may transmit the PPDU including the trigger frame by adjusting the transmission power. The non-legacy stations A-1 and A-2 included in the same BSS as the non-legacy access point HE A AP may transmit the UL MU PPDU based on the trigger frame. At this time, when the non-legacy stations A-1 and A-2 do not adjust the transmission power to an appropriate strength, the transmission of the PPDU of the non-legacy stations A-1 and A-2 may interfere with the transmission of the PPDU of the non-legacy station B-1. Therefore, a wireless communication terminal that needs to receive the PPDU transmission of the non-legacy station B-1 may not receive the PPDU transmitted by the non-legacy station B-1. Therefore, the wireless communication terminal that transmits the response frame for any frame may operate according to the following embodiments.

When the wireless communication terminal transmits the UL MU PPDU based on the trigger frame, the wireless communication terminal may transmit the UL MU PPDU by adjusting the transmission power so that the access point may receive the UL MU PPDU. Specifically, the transmission power of the UL MU PPDU may be adjusted according to the embodiment in which the wireless communication terminal other than the access point described above adjusts the transmission power. In addition, the wireless communication terminal other than the access point may adjust the transmission power of the UL MU PPDU based on the frequency bandwidth of the frequency band allocated by the wireless communication terminal. Specifically, when the first frequency bandwidth is larger than the second frequency band, the wireless communication terminal may use a smaller transmission power when transmitting the UL MU PPDU through the second frequency bandwidth than when transmitting the UL MU PPDU through the first frequency bandwidth. This is because if the frequency bandwidth through which the wireless communication terminal transmits the PPDU is small, the wireless communication terminal may transmit it to a far distance at the same transmission power. For example, when the transmission power at which the wireless communication terminal transmits the PPDU to the access point through the frequency band having the frequency bandwidth of 20 MHz is X, if a wireless communication terminal transmits a PPDU to an access point at the transmission power X through a frequency band having a frequency bandwidth of 10 MHz, the RSSI of the PPDU received by the access point may be unnecessarily high. Therefore, when a wireless communication terminal transmits a PPDU to an access point through a frequency band of 10 MHz, the PPDU may be transmitted to the access point with a transmission power less than the transmission power used when the PPDU is transmitted through a frequency band having a frequency bandwidth of 20 MHz.

The PPDU including the trigger frame may include the above SR application information. In addition, when the wireless communication terminal transmits the PPDU after the transmission of the PPDU including the trigger frame transmitted from the OBSS is completed, the transmission power may be adjusted based on the PPDU including the trigger frame transmitted from the OBSS. In addition, when the wireless communication terminal transmits the PPDU after the transmission of the PPDU including the trigger frame transmitted from the OBSS is completed, the transmission power may be adjusted based on the PPDU including the trigger frame transmitted from the OBSS. Also, when a wireless communication terminal transmits a PPDU within a Transmission Opportunity TXOP indicated by a trigger frame transmitted from an OBSS, the wireless communication terminal may adjust the transmission power of the PPDU based on the PPDU including the trigger frame transmitted from the OBSS. Also, at this time, even when the wireless communication terminal does not perform the CCA operation by applying the OBSS PD CCA threshold, the wireless communication terminal may transmit the PPDU by adjusting the transmission power based on the trigger frame transmitted from the OBSS. In another specific embodiment, the wireless communication terminal may perform the CCA operation by applying the OBSS PD CCA threshold and transmit the PPDU by adjusting the transmission power based on the trigger frame. In addition, the adjustment of the transmission power based on the PPDU including the trigger frame by the wireless communication terminal may be to adjust the transmission power based on the received signal strength of the PPDU including the trigger frame.

Figure 22:
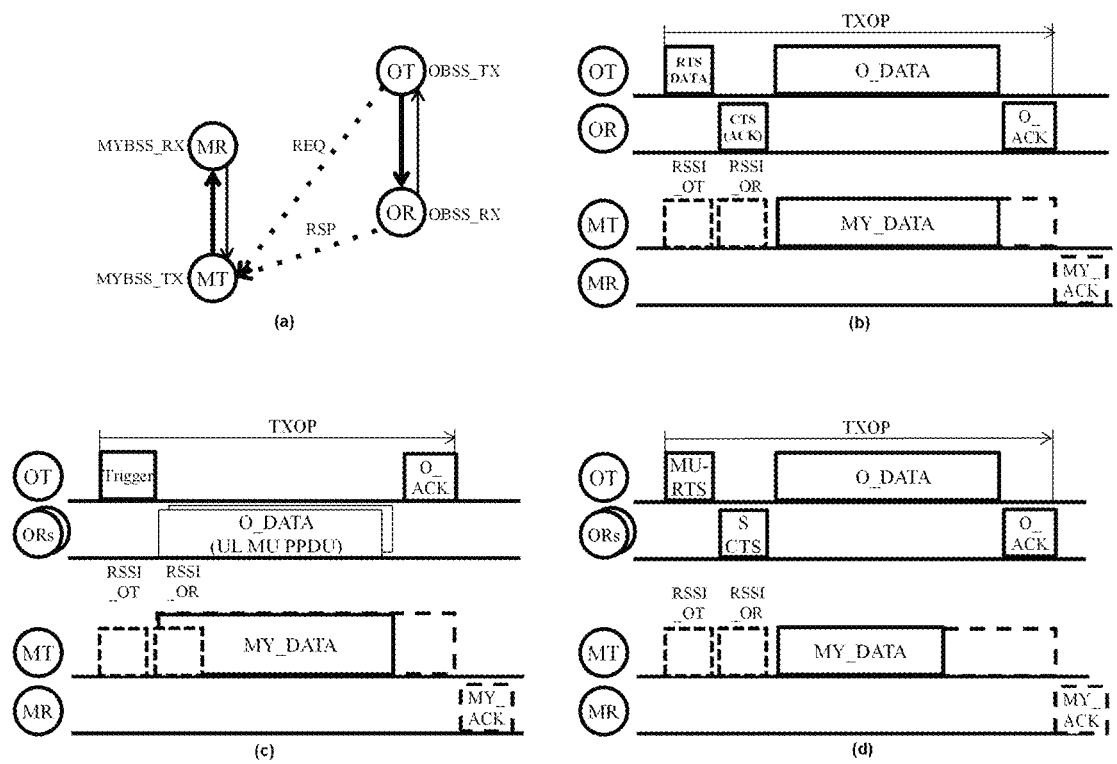
FIG. 22 shows that a wireless communication terminal according to an embodiment of the present invention performs an SR operation considering a transmission probability of a PPDU transmitted in an OBSS.

FIG. 22 shows that a wireless communication terminal according to an embodiment of the present invention performs an SR operation considering a transmission probability of a PPDU transmitted in an OBSS.

The wireless communication terminal performs an SR operation based on the PPDU exchange between the wireless communication terminals OBSS TX, OT initiating the data transmission sequence in the OBSS and the wireless communication terminals OBSS RX, OR participating in the data transmission sequence. At this time, the wireless communication terminal may be distinguished into a wireless communication terminal MYBSS TX, MT initiating a data transmission sequence in a BSS including a wireless communication terminal and a wireless communication terminal MYBSS RX, MR participating in a data transmission sequence. The specific relationship of MR, MT, OT, and OR may be the same as the network topology shown in FIG. 22(a).

When the received signal strength of the PPDU transmitted by the OT and the received signal strength of the PPDU transmitted by the OR are both lower than the OBSS PD CCA threshold, the MT may transmit the PPDU based on the SR operation. Specifically, when the received signal strength of the PPDU transmitted by the OT and the received signal strength of the PPDU transmitted by the OR are both lower than the OBSS PD CCA threshold, the MT may transmit PPDU by performing CCA based on the OBSS PD CCA threshold. At this time, the MT may keep the data transmission (MY_DATA) between the MT and the MR longer than the data transmission time point in the OBSS and the ACK frame transmission end time point for the data transmission. This is because the MT may not identify the distance between the MR and the OT and the distance between the MR and the OR, so that the influence of the PPDU transmitted from the MR on the reception of the OBSS PPDU may not be known. Specifically, the MT may transmit data as indicated by the dotted line in the embodiments of FIGS. 22(b), 22(c), and 22(d).

In another specific embodiment, the MT may transmit a PPDU based on the SR operation when the received signal strength of the PPDU transmitted by the OR is equal to or less than the OBSS PD CCA threshold. Specifically, when the received signal strength of the PPDU transmitted by the OR is equal to or less than the OBSS PD CCA threshold, the MT may transmit the PPDU by performing the CCA based on the OBSS PD CCA threshold. At this time, the MT may keep the data transmission (MY_DATA) between the MT and the MR shorter than the data transmission time point in the OBSS and the ACK frame transmission end time point for the data transmission. Also, the MR may transmit an ACK frame to the MT after the data transmission in the OBSS is completed. Specifically, the MT may transmit data as indicated by the solid line in the embodiments of FIGS. 22(b), 22(c) and 22(d). This is because the MT may not determine the distance between the MT and the OT, the distance between the MR and the OT, and the distance between the MR and the OR, so that the influence of the PPDU transmitted from the MT or MR on the reception of the OBSS PPDU may be known.

When the OT transmits a PPDU including an RTS frame and the OR transmits a PPDU including a CTS frame based on the RTS frame, all the embodiments described above may be applied.

When the OT transmits a PPDU including the trigger frame and the plurality of ORs transmit the UL MU PPDU based on the trigger frame, the MT may not receive a PPDU including a trigger frame transmitted by the OT and may receive a UL MU PPDU transmitted by the OR based on the trigger frame. At this time, the MT may transmit the PPDU based on the SR operation irrespective of the received signal strength of the UL MU PPDU measured by the MT. Specifically, this is because that the MT is far from the OT and the MT so that MT may not receive the PPDU including the trigger frame that the OT transmits the SR operation irrespective of the received signal strength of the UL MU PPDU. At this time, the MT may keep the data transmission (MY_DATA) between the MT and the MR shorter than the data transmission time point in the OBSS and the ACK frame transmission end time point for the data transmission. Also, the MR may transmit an ACK frame to the MT after the data transmission in the OBSS is completed. Since the MT may not determine the distance between the MT and the OR, MT may be difficult to determine the influence that the PPDU transmission of the MT will have when the PPDU including the OT's ACK frame is received by the OR.

When the OT transmits a PPDU including an MU-RTS frame and a plurality of ORs transmit a PPDU including a Simultaneous CTS (SCTS) based on an MU-RTS frame, the received signal strength of the PPDU including the SCTS frame measured by the wireless communication terminal may be a value obtained by combining the received signal strengths of PPDUs transmitted by a plurality of ORs. Accordingly, the MT scales the received signal strength of the PPDU including the SCTS frame, and performs the SR operation based on the scaled received signal strength. Specifically, the MT scales the received signal strength of the PPDU including the SCTS frame and adjusts the OBSS PD CCA threshold based on the scaled received signal strength. At this time, the MT may scale the received signal strength based on the number of receiving wireless communication terminals represented by the MU-RTS frame. In another specific embodiment, the received signal strength may be scaled based on a pre-specified value.

The wireless communication terminal receives the PPDU transmitted from the OBSS and performs the SR operation by applying the OBSS PD CCA threshold to the corresponding PPDU, or performs the SR operation by applying the OBSS PD CCA threshold when receiving one of the PPDUs transmitted from the OBSS and receiving the next PPDU transmitted from the OBSS. Specifically, when the wireless communication terminal receives the PPDU including the control frame, the wireless communication terminal may perform the SR operation as in the following embodiments. When the wireless communication terminal receives the PPDU transmitted from the OBSS and including only the control frame, the wireless communication terminal may store only the received signal strength of the corresponding PPDU without performing the SR operation on the PPDU. At this time, when the wireless communication terminal receives the PPDU including only the control frame transmitted from the OBSS and then receives the PPDU including the data frame transmitted from the OBSS, the wireless communication terminal may perform the SR operation based on the previously stored received signal strength. When the wireless communication terminal receives the PPDU including the control MPDU and the data MPDU or the management MPDU together transmitted from the OBSS, when the duration of the PPDU is longer than a predetermined length, the SR operation may be performed when the corresponding PPDU is received. At this time, the wireless communication terminal may determine the duration of the PPDU based on the L_LENGTH field of the L-SIG field.

In addition, when the wireless communication terminal receives the PPDU including the data frame, the wireless communication terminal may perform the SR operation as in the following embodiments. Specifically, when the wireless communication terminal receives a PPDU including one or more data MPDUs and the duration of the PPDU is less than a predetermined length, the wireless communication terminal may store only the received signal strength of the PPDU without performing the SR operation on the PPDU. Further, after the wireless communication terminal receives the PPDU including the data frame, when receiving a PPDU including a control frame, the wireless communication terminal may store only the received signal strength of the corresponding PPDU without performing the SR operation for the PPDU. At this time, the control frame may be an ACK frame. The reason that the wireless communication terminal included in the OBSS transmits a data frame and receives a control frame such as an ACK frame may be an operation for notifying the surrounding BSSs of the strength of the received signal at the beginning of the transmission sequence.

In addition, the PPDU may include information indicating that the SR operation is not allowed. The PPDU including the frame of the transmitted control frame before the data frame transmission may include information indicating that the SR operation is not permitted. Also, the wireless communication terminal may perform the SR operation based on the information indicating that the SR operation included in the PPDU transmitted from the OBSS is not permitted. Specifically, the wireless communication terminal receiving the PPDU including the information indicating that the SR operation is not permitted may save only the received signal strength without performing the SR operation for the PPDU. Also, the SR application information described above may indicate that the SR operation is not allowed.

Figure 23:
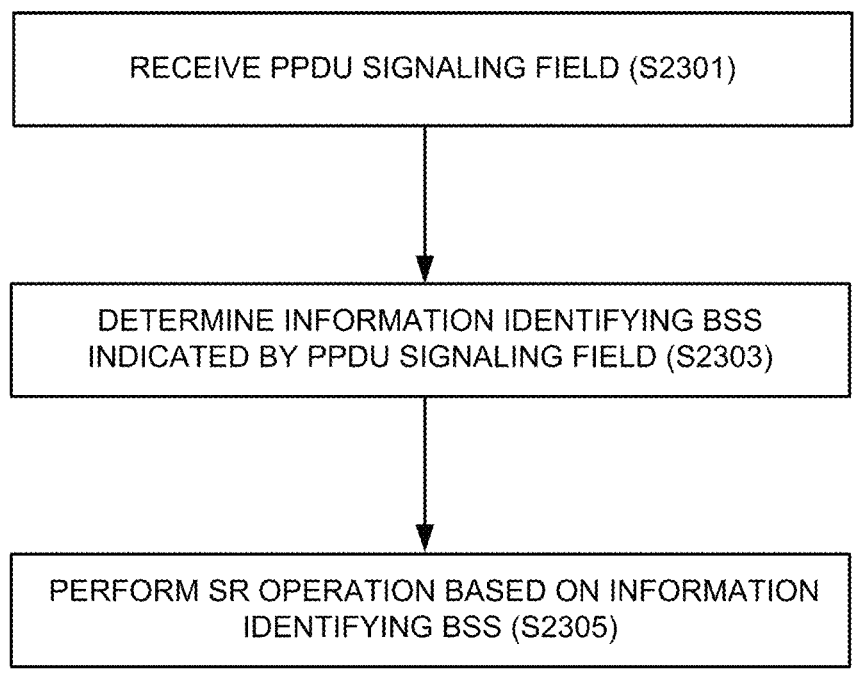
FIG. 23 shows the operation of a wireless communication terminal according to an embodiment of the present invention.

FIG. 23 shows the operation of a wireless communication terminal according to an embodiment of the present invention.

The wireless communication terminal receives the signaling field of the PPDU (S2301). Specifically, when the wireless communication terminal detects the transmission of the PPDU, the wireless communication terminal may start receiving the PPDU and receive the signaling field of the PPDU. The wireless communication terminal may receive the signaling field of the PPDU according to the embodiments described with reference to FIGS. 9, 10, 12, and 13.

The wireless communication terminal determines information identifying the BSS indicated by the signaling field of the PPDU (S2303). At this time, the signaling field of the PPDU may be the HE-SIG-A field described above. In addition, the information identifying the BSS may be the BSS color described above.

The wireless communication terminal performs the SR operation based on the information identifying the BSS (S2305). Specifically, the wireless communication terminal may access the channel based on the information identifying the BSS. In the specific embodiment, the wireless communication terminal may determine whether the corresponding PPDU is the PPDU transmitted from the BSS including the wireless communication terminal based on the BSS color. Also, the wireless communication terminal may determine whether the corresponding PPDU is the PPDU transmitted from the BSS including the wireless communication terminal, based on the Address field of the MAC header included in the PPDU. Specifically, the wireless communication terminal may determine whether the corresponding PPDU is a PPDU transmitted from the BSS including the wireless communication terminal based on at least one of a transmitting STA address (TA) field, a receiving STA address (RA) field, and a BSSID field of an Address field of a MAC header. When the BSS including the wireless communication terminal has the BSSID included in the multiple BSSID set, when the wireless communication terminal determines whether the received frame is an Intra-BSS frame or an Inter-BSS frame, the wireless communication terminal may regard a BSSID included in the corresponding multiple BSSID set as a BSSID of the BSS including the wireless communication terminal. Also, when the wireless communication terminal determines whether the received frame is an Intra-BSS frame or an Inter-BSS frame, the wireless communication terminal sets the Individual/Group bit of the Address field of the MAC header to 0, and compares the value of the Address field with the BSSID of the BSS including the wireless communication terminal.

When the first determination on whether the BSS including the PPDU is the same as the BSS including the wireless communication terminal based on the information for identifying a BSS indicated by the signaling field of the PPDU differs from the second determination on whether the BSS including the PPDU is the same as the BSS including the wireless communication terminal based on the Address field of the MAC header included in the PPDU, based on the second determination, the wireless communication terminal may determine whether the BSS including the PPDU is the same as the BSS including the wireless communication terminal. The wireless communication terminal may determine whether the corresponding PPDU is a PPDU transmitted from the BSS including the wireless communication terminal according to the embodiments described with reference to FIGS. 7 and 8 and FIGS. 15 and 16.

The wireless communication terminal may perform the SR operation according to whether the PPDU received by the wireless communication terminal is the PPDU transmitted from the BSS including the wireless communication terminal or the PPDU transmitted from the OBSS. Specifically, the SR operation may include an operation of accessing the channel depending on whether the received PPDU is a PPDU transmitted from a BSS including a wireless communication terminal or a PPDU transmitted from another BSS. In a specific embodiment, the operation of accessing the channel may include a CCA operation and a deferral operation. For example, the wireless communication terminal may adjust a CCA threshold depending on whether the PPDU received by the wireless communication terminal is a PPDU transmitted from the BSS including the wireless communication terminal or a PPDU transmitted from the OBSS. At this time, the wireless communication terminal may perform the CCA operation based on at least one of PD, ED, and RD. Also, the CCA threshold may be at least one of a PD CCA threshold, an ED CCA threshold, and an RD CCA threshold.

Also, when a wireless communication terminal uses a frequency band that is divided into a primary channel and a secondary channel, the wireless communication terminal may perform the CCA operation in the primary channel and the secondary channel. Specifically, the wireless communication terminal may use a CCA threshold different from the CCA threshold used in the primary channel, in the secondary channel. At this time, the CCA threshold may be the PD CCA threshold. In addition, when the PPDU is not transmitted in the primary channel, the wireless communication terminal may determine that the PPDU transmitted in the secondary channel is transmitted in the BSS different from the BSS including the wireless communication terminal. Specifically, when a wireless communication terminal uses a frequency band that is divided into a primary channel and a secondary channel, the wireless communication terminal may operate according to the embodiments described with reference to FIGS. 18 to 20.

In addition, in the SR operation, the wireless communication terminal may adjust the transmission power of the PPDU. The wireless communication terminal may adjust the transmission power based on whether the wireless communication terminal is an access point or a wireless communication terminal other than an access point. In addition, the wireless communication terminal may adjust the transmission power of the PPDU to be transmitted based on the type of frame included in the PPDU transmitted from the OBSS. Specifically, the wireless communication terminal may adjust the transmission power of the PPDU to be transmitted according to whether the frame included in the PPDU is a control frame or a data frame. Also, the wireless communication terminal may adjust the transmission power of the PPDU to be transmitted according to whether the frame included in the PPDU is a trigger frame or an S-CTS frame. In a specific embodiment, when the PPDU received by the wireless communication terminal includes the trigger frame transmitted from the OBSS, the wireless communication terminal may measure the strength of the received signal of the PPDU. At this time, after the transmission of the trigger frame is completed, the wireless communication terminal may transmit the PPDU by adjusting the transmission power based on the received signal strength. Specifically, the wireless communication terminal may transmit the PPDU by adjusting the transmission power based on the received signal strength while the uplink PPDU transmitted based on the trigger frame is transmitted. In a specific embodiment, the wireless communication terminal may transmit the PPDU by adjusting the transmit power based on the received signal strength during Transmission Opportunity (TXOP) indicated by the trigger frame.

In addition, the signaling field of the PPDU may include information indicating whether the Spatial Reuse (SR) operation is permitted or not, and the transmission power of the PPDU may be adjusted based on information indicating whether the SR operation is allowed or not. Specifically, the wireless communication terminal may adjust the transmission power of the PPDU when the information indicating whether the SR operation is permitted indicates an SR operation permission. Specifically, when the information indicating whether the SR operation is permitted indicates that the SR operation is not allowed, the wireless communication terminal may not perform the SR operation for the PPDU. At this time, the wireless communication terminal may store only the received signal strength of the corresponding PPDU. In addition, the signaling field of the PPDU may include information on the transmission power of the PPDU. The information on the transmission power may be the TCI field described above. Further, the information on the transmission power may be information indicating the transmission power applied to the transmission of the PPDU. Specifically, the wireless communication terminal may adjust transmission power according to the embodiments described with reference to FIGS. 21 and 22.

In addition, the wireless communication terminal may perform the power save operation according to whether the PPDU received by the wireless communication terminal is a PPDU transmitted from the BSS including the wireless communication terminal or a PPDU transmitted from the OBSS. Specifically, the wireless communication terminal may perform a power save operation according to the embodiments described with reference to FIG. 9 to FIG. 14.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal that communicates wirelessly, the terminal comprising:
   a transceiver; and
   a processor,
   wherein the processor is configured to:
   receive a signaling field of a PLCP Protocol Data Unit (PPDU) through the transceiver,
   obtain a Basic Service Set (BSS) color field from the signaling field, wherein the BSS color field indicates a BSS color which identifies a BSS,
   obtain an Address field of a MAC header from the PPDU,
   determine that the PPDU includes an Inter-BSS frame when the BSS color indicated by the BSS color field is the same as a BSS color of a BSS including the wireless communication terminal, and the obtained Address field of the MAC header indicates a BSS which is different from the BSS including the wireless communication terminal as a BSS from which the PPDU is transmitted, and
   access a channel based on the determination that the PPDU includes an Inter-BSS frame,
   wherein the Address field of the MAC header indicates a MAC address related to a MAC Protocol Data Unit (MPDU), wherein the BSS color of the BSS including the wireless communication terminal is signaled by a base wireless communication terminal which is associated with the wireless communication terminal.

2. The wireless communication terminal of claim 1, wherein the maximum number of BSSs being able to be identified by the BSS color is smaller than the maximum number of BSSs being able to be identified by the MAC address.

3. The wireless communication terminal of claim 1, wherein the processor is configured to determine whether the PPDU includes an Inter-BSS frame or an Intra-BSS frame based on at least one of a transmitting STA address (TA) field, a receiving STA address (RA) field, and a BSSID field of the Address field of the MAC header.

4. The wireless communication terminal of claim 1, wherein the processor is configured to determine, based on the determination that the PPDU includes an Inter-BSS frame, a Clear Channel Assessment threshold which is used for accessing the channel.

5. The wireless communication terminal of claim 1, wherein the processor is configured to enter a power save mode based on the determination that the PPDU includes an Inter-BSS frame.

6. An operating method of a wireless communication terminal that communicates wirelessly, the method comprising:
   receiving a signaling field of a PLCP Protocol Data Unit (PPDU) through the transceiver,
   obtaining an Address field of a MAC header from the PPDU,
   obtaining a Basic Service Set (BSS) color field from the signaling field, wherein the BSS color field indicates a BSS color which identifies a BSS,
   determining that the PPDU includes an Inter-BSS frame when the BSS color indicated by the BSS color field is the same as a BSS color of a BSS including the wireless communication terminal, and the obtained Address field of the MAC header indicates a BSS which is different from the BSS including the wireless communication terminal as a BSS from which the PPDU is transmitted, and
   accessing a channel based on the determination that the PPDU includes an Inter-BSS frame,
   wherein the Address field of the MAC header indicates a MAC address related to a MAC Protocol Data Unit (MPDU),
   wherein the BSS color of the BSS including the wireless communication terminal is signaled by a base wireless communication terminal which is associated with the wireless communication terminal.

7. The operating method of claim 6, wherein the maximum number of BSSs being able to be identified by the BSS color is smaller than the maximum number of BSSs being able to be identified by the MAC address.

8. The operating method of claim 6, wherein the accessing the channel comprises determining whether the PPDU includes an Inter-BSS frame or an Intra-BSS frame based on at least one of a transmitting STA address (TA) field, a receiving STA address (RA) field, and a BSSID field of the Address field of the MAC header.

9. The operating method of claim 6, wherein the accessing the channel comprises determining a Clear Channel Assessment threshold which is used for accessing the channel based on the determination that the PPDU includes an Inter-BSS frame.

* * * * *